(12) United States Patent
Oshima et al.

(10) Patent No.: US 9,250,813 B2
(45) Date of Patent: Feb. 2, 2016

(54) STORAGE SYSTEM COUPLED TO A HOST COMPUTER AND A MANAGEMENT DEVICE

(75) Inventors: Yutaka Oshima, Odawara (JP); Yutaka Takata, Ninomiya (JP); Yoshinori Ohira, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 443 days.

(21) Appl. No.: 13/640,770

(22) PCT Filed: Jul. 18, 2012

(86) PCT No.: PCT/JP2012/004584
§ 371 (c)(1),
(2), (4) Date: Oct. 12, 2012

(87) PCT Pub. No.: WO2014/013524
PCT Pub. Date: Jan. 23, 2014

(65) Prior Publication Data
US 2014/0025916 A1    Jan. 23, 2014

(51) Int. Cl.
  G06F 12/00     (2006.01)
  G06F 3/06      (2006.01)
(52) U.S. Cl.
  CPC .......... *G06F 3/0611* (2013.01); *G06F 3/064* (2013.01); *G06F 3/0647* (2013.01); *G06F 3/0665* (2013.01); *G06F 3/0685* (2013.01)

(58) Field of Classification Search
  CPC .... G06F 3/0665; G06F 3/0668; G06F 3/0685
  USPC ........................................... 711/173
  See application file for complete search history.

(56) References Cited

U.S. PATENT DOCUMENTS

| 2003/0065898 | A1* | 4/2003 | Flamma et al. | 711/165 |
| 2003/0200388 | A1* | 10/2003 | Hetrick | 711/114 |
| 2006/0004957 | A1* | 1/2006 | Hand et al. | 711/113 |
| 2010/0281230 | A1 | 11/2010 | Rabii et al. | |
| 2011/0179247 | A1 | 7/2011 | Mine et al. | |
| 2011/0246740 | A1* | 10/2011 | Yata et al. | 711/165 |
| 2012/0005435 | A1 | 1/2012 | Emaru et al. | |
| 2012/0166748 | A1 | 6/2012 | Satoyama et al. | |

FOREIGN PATENT DOCUMENTS

| WO | 20101131292 A1 | 11/2010 |
| WO | 2011/092738 A1 | 8/2011 |
| WO | 2011/117925 A1 | 9/2011 |
| WO | 2012/090247 A1 | 7/2012 |

* cited by examiner

*Primary Examiner* — Prasith Thammavong
(74) *Attorney, Agent, or Firm* — Volpe and Koenig, P.C.

(57) ABSTRACT

When a plurality of applications operating in a host computer or a storage system uses a same pool, actual data constantly allocated to an upper tier drive satisfying the required response performance will continue to increase. Therefore, when data is migrated by IOPS in page units, the access performance such as the response speed may not be satisfied. Therefore, according to the present invention, multiple virtual volumes used in applications are subjected to grouping. Relocation conditions corresponding to performances required for each group are set in advance, and reallocation of tiers according to the relocation conditions is performed.

10 Claims, 37 Drawing Sheets

Fig. 7

| Pool Volume # (70a) | Page # (70b) | Page Use State (70c) |
|---|---|---|
| 50 | 0 | Used |
| 50 | 1 | Used |
| 50 | 2 | Not Used |
| 50 | 3 | Used |
| 50 | ... | ... |

Fig. 8

| Virtual Volume # (80a) | Virtual Page # (80b) | I/O Count per Virtual Page (80c) |
|---|---|---|
| 100 | 0 | 10 |
| 100 | 1 | 0 |
| 100 | 2 | 512 |
| 100 | 3 | 111 |
| 101 | 10 | 11 |
| 101 | 20 | 111 |
| 103 | 10 | 12 |
| 103 | 11 | 190 |
| 104 | 0 | 635 |
| 104 | 1 | 241 |
| 104 | 2 | 12 |
| ... | ... | ... |

Fig.15

| Virtual Volume # | I/O Count Range | Page Count | Cumulative I/O per I/O Count Range |
|---|---|---|---|
| 0 | 0 - 0 | 561 | 0 |
| 0 | 1 - 1 | 327 | 327 |
| 0 | 2 - 3 | 141 | 305 |
| 0 | 4 - 7 | 57 | 290 |
| 0 | 8 - 15 | 72 | 796 |
| 0 | 15 - 31 | 136 | 3258 |
| 0 | 32 - 63 | 0 | 0 |
| ... | ... | ... | ... |
| 1 | 0 - 0 | 721 | 0 |
| 1 | 1 - 1 | 251 | 251 |
| 1 | 2 - 3 | 99 | 249 |
| 1 | 4 - 7 | 31 | 172 |
| ... | ... | ... | ... |
| 2 | 0 - 0 | 200 | 0 |
| 2 | 1 - 1 | 20 | 20 |
| ... | ... | ... | ... |
| 3 | 0 - 0 | 300 | 0 |
| 3 | 1 - 1 | 30 | 30 |
| ... | ... | ... | ... |
| 4 | 0 - 0 | 400 | 0 |
| 4 | 1 - 1 | 40 | 40 |
| ... | ... | ... | ... |
| n | 0 - 0 | 215 | 0 |
| ... | ... | ... | ... |

| Pool # | I/O Count Range | Page Count | Cumulative I/O per I/O Count Range |
|---|---|---|---|
| 0 | 0 - 0 | 1282 | 0 |
| 0 | 1 - 1 | 578 | 578 |
| 0 | 2 - 3 | 240 | 554 |
| 0 | 4 - 7 | 88 | 462 |
| 0 | 8 - 15 | 72 | 796 |
| 0 | 15 - 31 | 136 | 5258 |
| 0 | 32 - 63 | 1 | 61 |
| 0 | ... | ... | ... |
| ... | ... | ... | ... |
| 1 | 0 - 0 | 900 | 0 |
| 1 | 1 - 1 | 90 | 90 |
| 1 | 2 - 3 | 9 | 23 |
| 1 | 4 - 7 | 0 | 0 |
| ... | ... | ... | ... |
| n | 0 - 0 | 399 | 0 |
| ... | ... | ... | ... |

Fig.20

| POOL# | TG# | Virtual Volume # belonging to each TG | Tier0 Maximum | Tier0 Minimum | Tier1 Maximum | Tier1 Minimum | Tier2 Maximum | Tier2 Minimum |
|---|---|---|---|---|---|---|---|---|
| 0 | 0 | 0,1,2 | Not Set | 30 | - | - | - | Not Set |
| 0 | 1 | 3,4 | 30 | Not Set | - | - | - | 20 |
| 1 | 0 | 100 | 30 | 20 | - | - | - | Not Set |
| 1 | 1 | 101,102 | Not Set | Not Set | - | - | - | Not Set |
| 1 | 2 | 103,104 | 40 | 10 | - | - | - | 20 |
| 1 | 3 | 105,106 | Not Set | Not Set | - | - | - | 10 |
| 2 | 0 | 64,65,66 | 50 | Not Set | - | - | - | Not Set |
| 2 | 1 | 67,68,69,70 | Not Set | 20 | - | - | - | 30 |
| 2 | 2 | 71,72 | 30 | Not Set | - | - | - | 15 |

Fig.26
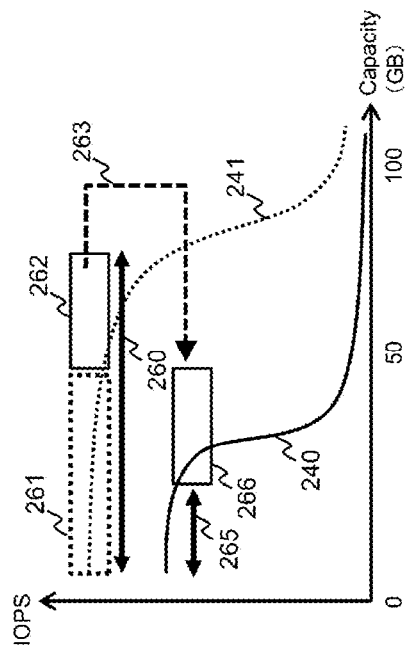
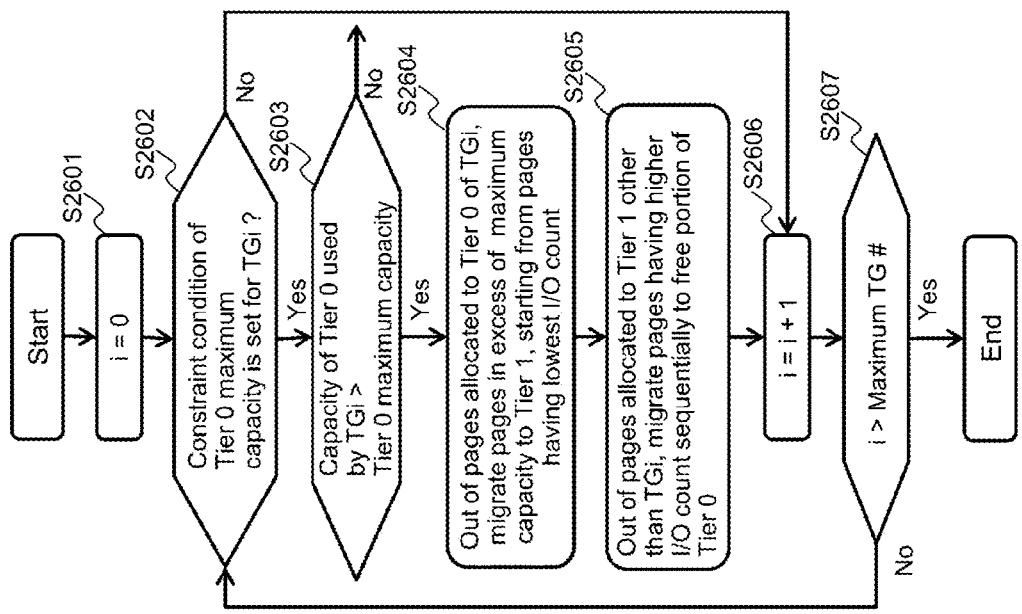

| POOL# | TG# | Virtual volume # belonging to each TG | Weighting Condition | |
|---|---|---|---|---|
| | | | Scope | Weight |
| 0 | 0 | 0, 1, 2 | 30GB | Two times |
| | 1 | 3, 4 | Not set | Not set |
| 1 | 0 | 100 | Not set | Not set |
| | 1 | 101, 102 | Not set | Not set |
| | 2 | 103, 104 | Not set | Not set |
| | 3 | 105, 106 | Not set | Not set |
| 2 | 0 | 64, 65, 66 | 100GB | Two times |
| | 1 | 67, 68, 69, 70 | 20GB | Three times |
| | 2 | 71, 72 | 30GB | Four times |

| LDEV ID | LDEV Name | Status | Emulation Type | Capacity Total | Used | Used (%) | Number of Paths | TG Number | Scope | Weighting Coefficient |
|---|---|---|---|---|---|---|---|---|---|---|
| 00:00:21 | SAS6D2... | Normal | OPEN-V CVS | 2926 Pa... | 0 Page | 0 | 0 | 1 | 100 | 10 |
| 00:00:22 | SAS6D2... | Normal | OPEN-V CVS | 2926 Pa... | 0 Page | 0 | 0 | 1 | 100 | 10 |
| 00:00:23 | SAS6D2... | Normal | OPEN-V CVS | 2926 Pa... | 0 Page | 0 | 0 | 2 | 25 | 5 |
| 00:00:24 | SAS6D2... | Normal | OPEN-V CVS | 2926 Pa... | 0 Page | 0 | 0 | 2 | 25 | 5 |
| 00:00:25 | SAS6D2... | Normal | OPEN-V CVS | 2926 Pa... | 0 Page | 0 | 0 | 3 | - | - |

330, 332

Fig.34
(a) Determine relocation plan, compare response time after relocation with computed value
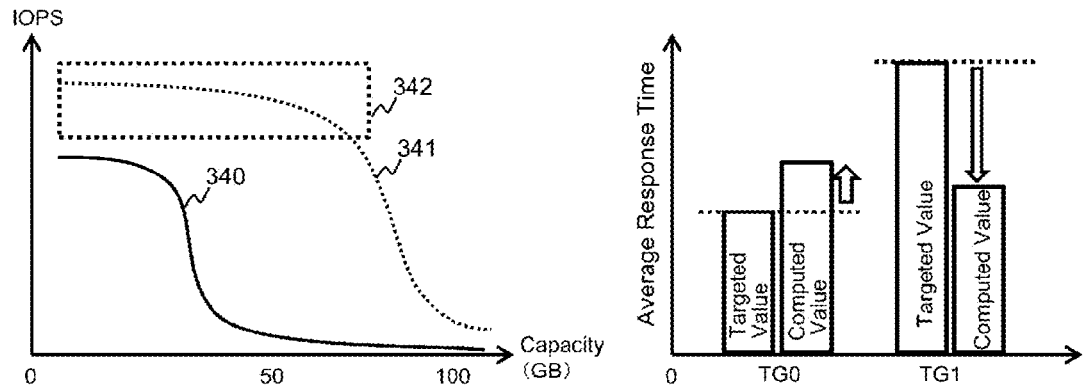
(b) Re-relocation processing
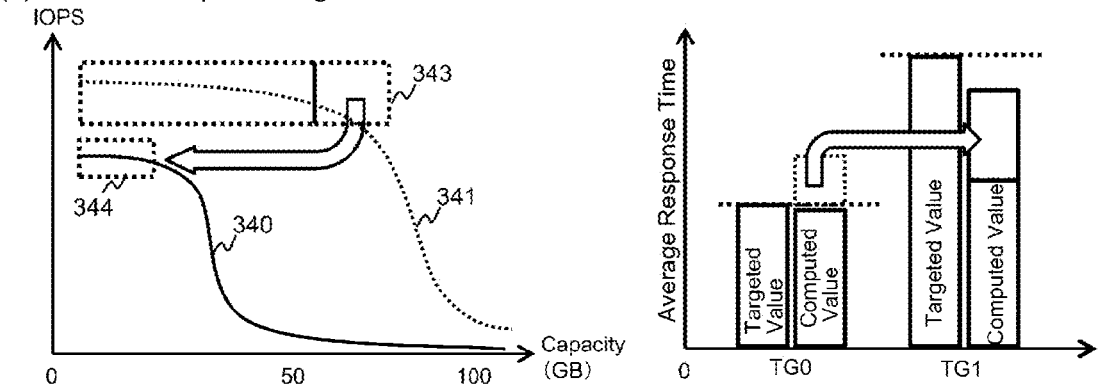

| POOL# | TG# | Virtual volume # belonging to each TG | Targeted average response time |
|---|---|---|---|
| 0 | 0 | 0,1,2 | 5ms |
|   | 1 | 3,4 | 8ms |
| 1 | 0 | 100 | 3ms |
|   | 1 | 101,102 | Not set |
|   | 2 | 103,104 | Not set |
|   | 3 | 105,106 | Not set |
| 2 | 0 | 64,65,66 | 5ms |
|   | 1 | 67,68,69,70 | Not set |
|   | 2 | 71,72 | 3ms |

STORAGE SYSTEM COUPLED TO A HOST COMPUTER AND A MANAGEMENT DEVICE

TECHNICAL FIELD

The present invention relates to a storage system and a storage control method.

BACKGROUND ART

In order to cope with recent economic statuses and rapidly increasing data quantity, the demands of users are soaring to suppress the investment costs of IT devices and optimize the cost-effectiveness. In order to respond to such demands, a capacity virtualizing function in storage systems called thin provisioning or dynamic provisioning (hereinafter referred to as DP function) is provided.

The DP function allocates a storage area (pool page) of given storage units to the virtual volume that the host computer uses when a write request is output from a host computer to a storage system.

Recently, a dynamic relocation function called dynamic tiering (hereinafter referred to as DT function) taught in patent literature 1 having further advanced the capacity virtualizing function has been proposed.

According to the DT function, a pool is composed by combining a plurality of storage drives having different cost performances and different bit costs (SSD (Solid State Drive), SAS (Serial Attached SCSI), SATA (Serial ATA) etc.), and virtual volumes are composed from the pools having been divided into tiers.

Then, the access frequency (I/O count) is measured per page unit as described, wherein the pages having high access frequencies are migrated to high speed upper tier drives such as SSDs and pages having low access frequencies are migrated to slow lower tier drives such as SATAs, in order to automatically optimize the load caused by the various access frequencies of respective drives.

CITATION LIST

Patent Literature

PTL 1: PCT International Publication No. WO2011/117925

SUMMARY OF INVENTION

Technical Problem

According to the prior art, the segment (page) storing real data of a file requiring high speed response but having a low I/O frequency is migrated to the drive of a lower tier having a low speed response in which the access frequency per unit time (IOPS) is low since the I/O count is small.

As a result, when the application actually uses the file, if the real data of the file is stored in a low-speed lower tier drive, the file reading performance does not satisfy the required response performance, and the operation of the application may be delayed.

Therefore, it is necessary to constantly allocate a page storing real data of the file having a requested response performance in a tier drive satisfying the required response performance.

If a plurality of applications operating in a host computer or a storage system uses the same pool, the real data to be constantly allocated to a tier drive satisfying the required response performance, which may be the uppermost tier, for example, is continuously increased.

Therefore, even when migration is performed in page units considering the I/O access frequency (IOPS: IO Per Second) in page units, there are cases where the access performance such as the response time cannot be satisfied.

The object of the present invention is to provide a storage system and a storage control method capable of reducing the influence of deterioration of response performance among applications.

Solution to Problem

Virtual volumes used in a plurality of applications operating in a host computer or a storage system are subjected to grouping. Then, the relocation conditions according to the response performance required for each group is set in advance, and relocation of tiers is performed according to the relocation conditions.

Advantageous Effects of Invention

By performing grouping of virtual volumes used by the application, setting relocation conditions according to the performance required per group, and performing relocation according to relocation conditions, it becomes possible to reduce the influence of deterioration of response performance among applications.

BRIEF DESCRIPTION OF DRAWINGS

FIG. 7 is a view showing a configuration example of a pool page management table.

FIG. 8 is a view showing a configuration example of a virtual page I/O count management table.

FIG. 15 is a view showing a configuration example of a virtual volume I/O frequency distribution table.

FIG. 16 is a view showing a configuration example of a pool I/O frequency distribution table.

FIG. 20 is a view showing a configuration example of a TG setting information management table according to embodiment 1.

FIG. 21 is a view showing a configuration example of a TG setting screen when creating a virtual volume according to embodiment 1.

FIG. 23 is a view showing a configuration example of a TG setting confirmation screen for confirming the contents of the TG setting according to embodiment 1.

FIG. 26 is a flowchart showing the constraint condition processing of the maximum amount of use of Tier 0 according to embodiment 1.

FIG. 33 is a view showing a configuration example of a TG setting confirmation screen for confirming the contents of the TG setting according to embodiment 2.

FIG. 34 is a view showing the concept of page relocation/re-relocation processing by setting the targeted average response time according to embodiment 3.

FIG. 40 is a view showing a configuration example of a TG setting confirmation screen for confirming the contents of TG setting according to embodiment 3.

DESCRIPTION OF EMBODIMENTS

Figure 1:
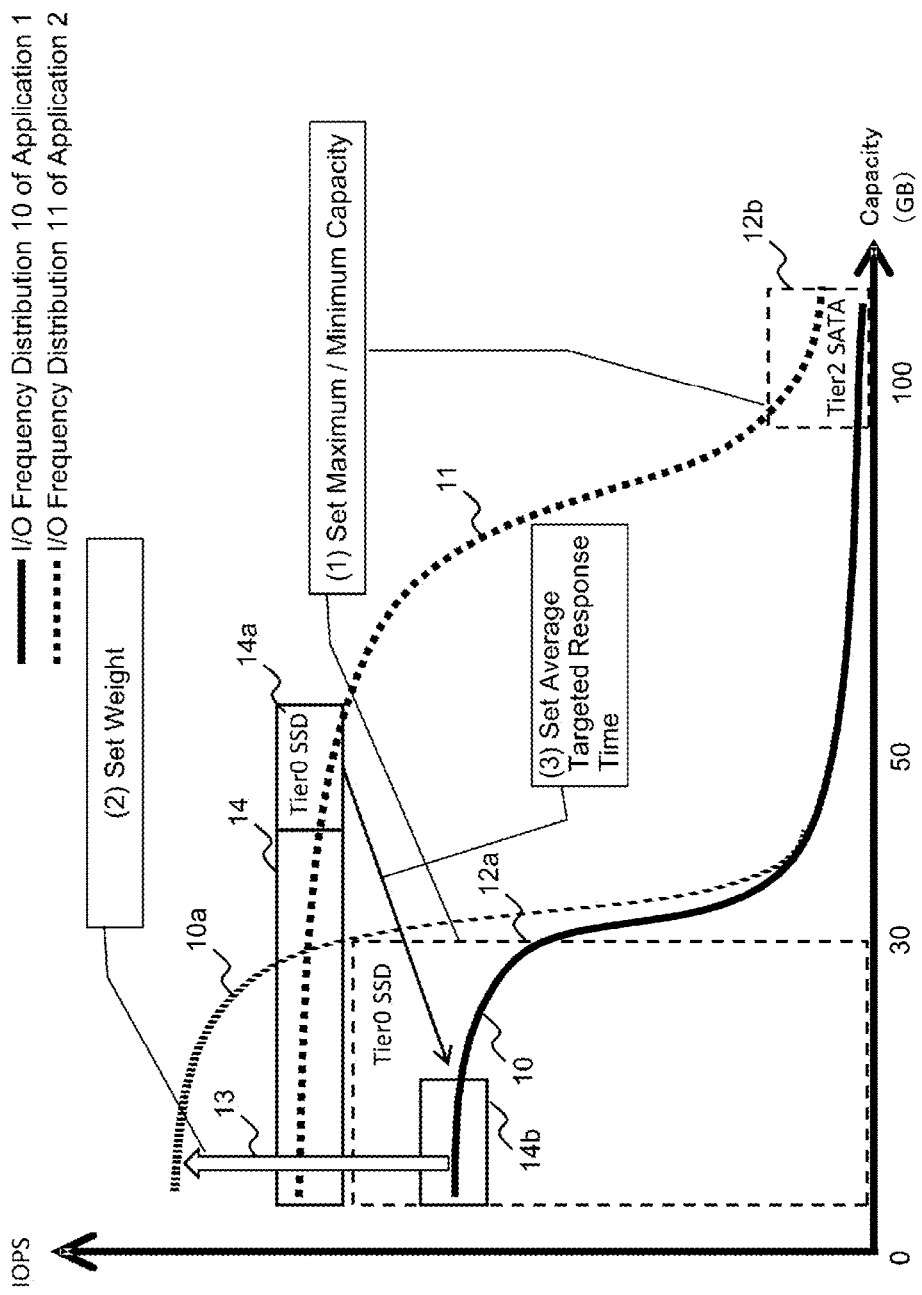
FIG. 1 is a conceptual diagram showing an outline of the present invention.

Now, the preferred embodiments of the present invention will be described with reference to the drawings. In the following description, various information are referred to as "management table" and the like, but the various information can also be expressed by data structures other than tables. Further, the "management table" can also be referred to as "management information" to show that the information does not depend on the data structure.

The processes are sometimes described using the term "program" or "tool" as the subject. The program is executed by a processor such as an MP (Micro Processor) or a CPU (Central Processing Unit) for performing determined processes.

A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or storage media, for example.

Each element, such as each PD (Physical Device), can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of the components can be one or more than one unless defined otherwise.

<Outline of the Invention>

Figure 2:
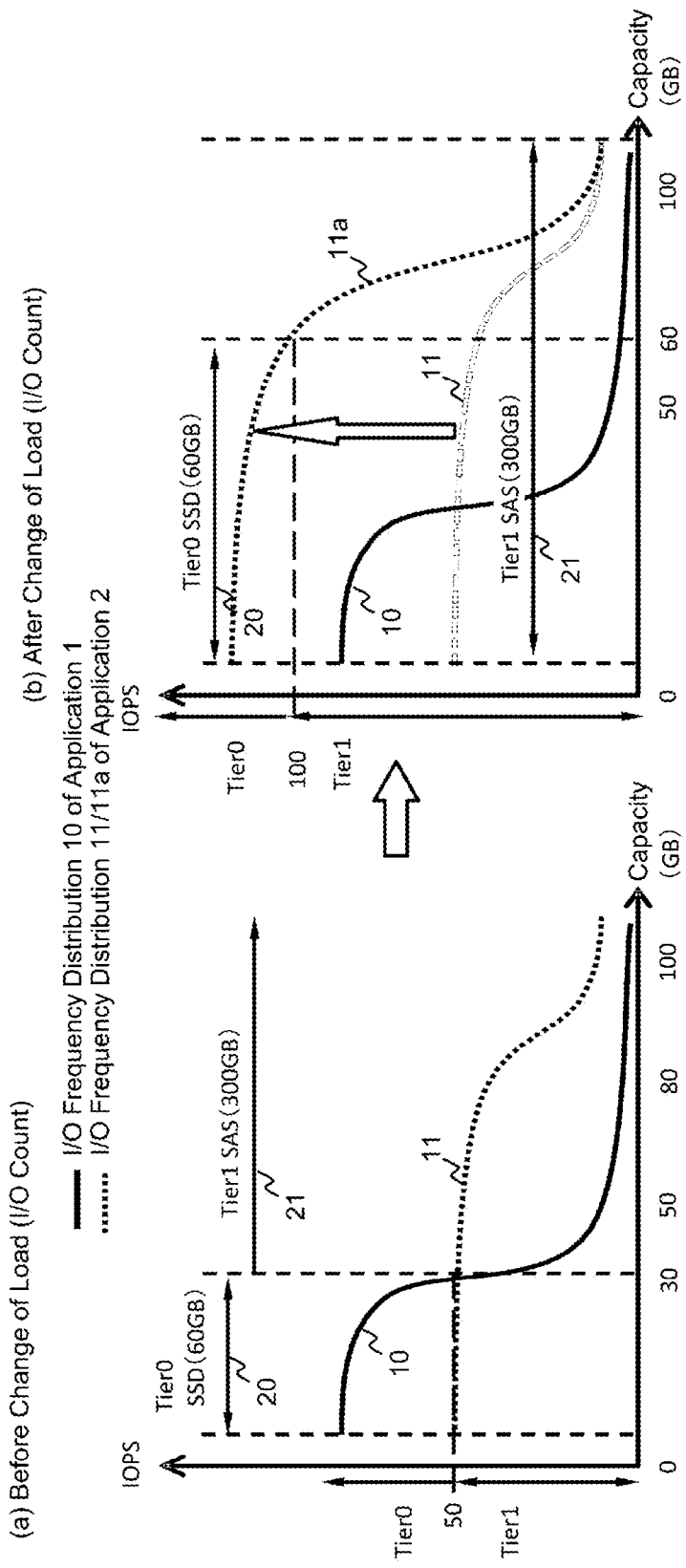
FIG. 2 is a view showing the problems according to the prior art.

FIG. 1 is a conceptual diagram showing an outline of the present invention. FIG. 2 is a view showing the problems according to the prior art.

In the present invention, as mentioned earlier, virtual volumes used in a plurality of applications operating in a host computer or a storage system are subjected to grouping. Then, by setting relocations conditions in advance corresponding to the performances required for each group, and performing relocation of tiers corresponding to the relocation conditions, the present invention enables to reduce the influence of deterioration of response performance among the respective applications.

First, the problems according to the prior art will be described with reference to FIG. 2.

At first, as shown in FIG. 2(a), it is assumed that a pool volume including Tier 0 20 composed of 60 GB SSD and Tier 1 21 composed of 300 GB SAS-type HDD is allocated to a virtual volume used by application 1 and a virtual volume used by application 2.

Further, the I/O frequency distribution of application 1 prior to the change of I/O access frequency is shown by reference 10, and the I/O frequency distribution of application 2 is shown by reference 11. It is assumed that each application uses 30 GB of Tier 0 and 150 GB of Tier 1, respectively.

Next, as shown in FIG. 2(b), the number of I/O accesses to virtual volumes used by application 2 is increased significantly, and the I/O access frequency is also increased. Then, the I/O frequency distribution of application 2 is changed from the state shown by reference number 11 to the state shown by reference number 11a, so that according to the DT (Dynamic Tiering) function of the prior art, the storage area (page) having a high I/O access frequency is relocated to an upper tier and data migration is performed. As a result, all of the Tier 0 (60 GB) 20 as upper tier is used by application 2, so that it cannot be used by application 1.

Therefore, even though the I/O access frequency of application 1 is not changed, the storage area (virtual page) having a capacity of 30 GB to which Tier 0 has been allocated must use Tier 1 21 composed of SAS HDD which has a lower speed than Tier 0 20. Therefore, a situation occurs in which the response performance of application 1 is deteriorated.

Therefore, according to the present invention, the virtual volumes used by the plurality of applications operating in the host computer or the storage system are subjected to grouping. After grouping, the following settings of page relocation conditions corresponding to the response performances required for each group are performed, which include the following:

(1) setting of maximum/minimum amount of use of each tier;

(2) setting of weighting of I/O frequency distribution; and (3) setting of average targeted response time.

Then, page relocation to a tier corresponding to the page relocation conditions is performed, so as to reduce the influence of deterioration of response performance among respective applications.

Actually, the setting of maximum/minimum amount of use of the capacity of each tier of FIG. 1 (1) sets the maximum and minimum values of usable capacity of each tier in application units, virtual volume units used by the application, and group units having assembled multiple virtual volumes as a group. Thus, biased tier use by each application or by each virtual volume used by the applications can be prevented.

According to the example of FIG. 1, a constraint condition is set to the storage system stating that the application 1 uses at least 30 GB (reference number 12a) of Tier 0. By setting such constraint condition, it becomes possible to prevent application 2 from exclusively using Tier 0 as shown in FIG. 2(*b*), and to reduce the deterioration of response performance of application 1.

Further, a constraint condition is set stating that the application 2 must use at least 20 GB (reference 12b) of Tier 2. By setting such constraint condition regarding Tier 2, it becomes possible to restrict the amount of use of Tier 0 or Tier 1 by application 2, so that the deterioration of response performance by application 1 can be reduced.

The setting of weighting to I/O frequency distribution of FIG. 1 (2) is to set the range of weighting and the weight with respect to the I/O frequency distribution of application 1. By setting the range of weighting and the weight thereof, it becomes possible to set the I/O frequency distribution 10 of application 1 to an apparent I/O frequency distribution 10a. Therefore, similar to FIG. 1 (1), it becomes possible to prevent the exclusive use of Tier 0 by application 2 and to reduce the deterioration of response performance of application 1.

The setting of targeted average response time (targeted value) of FIG. 1 (3) is performed by calculating an average response time per application and executing improvement of access performance by comparing the calculated value with the targeted value set in advance.

If the calculated value of average response time by application 1 exceeds the targeted value, a virtual page out of the virtual pages of application 2 that will not cause the average response time of application 2 to fall below the targeted average response time even if the virtual page allocated to Tier 0 is migrated to Tier 1 is searched, in order from the virtual pages having the least I/O counts.

The searched virtual page will be switched with the virtual page having the highest I/O counts of the virtual pages belonging to Tier 1 of application 1.

In other words, the virtual page allocated to Tier 0 (SSD) of reference 14a in the I/O frequency distribution of application 2 is switched with the virtual page allocated to Tier 1 (SAS) of reference 14b in the I/O frequency distribution of application 1.

Based on this page relocation processing, similar to FIG. 1 (1) and FIG. 1 (2), it becomes possible to prevent exclusive use of Tier 0 by application 2 and to reduce the deterioration of response performance by application 1. The detailed operation will be described in detail later. In the following description, the frequency distribution is separated into application frequency distribution, virtual volume frequency distribution, pool frequency distribution and so on, according to the contents of the invention.

<System Configuration>

Figure 3:
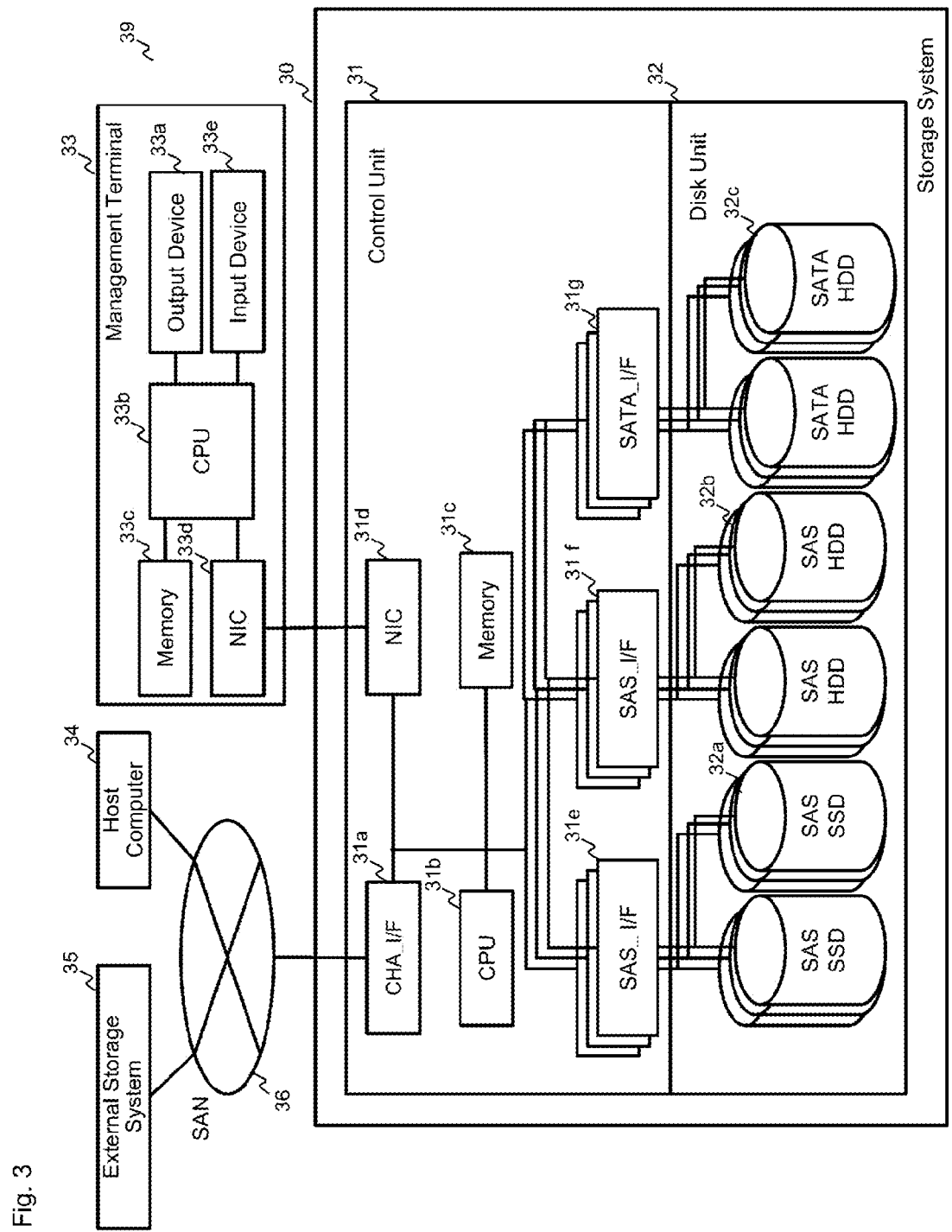
FIG. 3 is an overall configuration diagram of a storage system.

FIG. 3 is an overall configuration diagram of a storage system. A storage system 39 is composed of a storage system 30, a management terminal 33, a host computer 34, and an external storage system 35.

The storage system 30 has coupled thereto via a network such as a SAN (Storage Area Network) 36 and through a CHA_I/F (channel adapter interface) 31a one or more hosts and/or one or more external storage systems. The host computer 34 and the external storage system 35 reads data from the storage system 30 or writes data to the storage system 30 via the CHA_I/F 31a.

A management terminal 33 is coupled to the storage system 30 via a NIC (Network Interface Card) 31d and a NIC 33d using network protocols such as CIFS (Common Internet File System) and NFS (Network File System).

The storage system 30 can be broadly divided into a control unit 31 and a disk unit 32. The disk unit 32 is composed of a plurality of storage drives. The disk unit 32 can be composed of different physical types of storage drives.

The disk unit 32 according to the present embodiment includes, as storage drives, a SAS interface-type SSD 32a, a SAS type HDD 32b, and a SATA type HDD 32c. The storage drive is not restricted to those mentioned above, and can include FC (Fiber Channel) type HDDs or tapes. The disk unit 32 is coupled to the control unit 31 via a communication line such as a fiber channel cable, and constitutes RAID groups via a plurality of storage drives.

The control unit 31 includes a CHA_IF 31a, a CPU 31b, a memory 31c, a NIC 31d, a SAS_I/F controller 31e, a SAS_I/F controller 31f, and a SAS_I/F controller 31g.

The CHA_IF 31a receives an I/O command (write command or read command) from the host computer 34 to the storage system 30, and transfers the received I/O command to the CPU 31b. Further, the CHA_I/F 31a is also used for transferring data between the storage system 30 and the external storage system 35.

The CPU 31b is a processor for controlling the whole storage system 30. In other words, the CPU processes I/O accesses from the host computer 34 and operates applications programs (hereinafter referred to as application) such as for performing a local copy process described later.

The memory 31c is a memory device including a volatile memory such as a DRAM (Dynamic Random Access Memory) and/or a nonvolatile memory such as a flash memory. The memory 31c has, for example, a storage area (hereinafter referred to as cache memory area, which is abbreviated as CM) for temporarily storing a data element being the targeted of I/O with respect to the virtual page. Further, the memory 31c has a storage area for storing various control information, computer programs and management tables (hereinafter referred to as shared memory area, which is abbreviated as SM).

The SAS_IF controller 31e, the SAS_I/F controller 31f and the SAS_I/F controller 31g are respectively coupled with the SSD 32a, the SAS type HDD 32b and the SATA type HDD 32c of the disk unit 32.

The control unit 31 controls the writing and reading of data to/from the disk unit according to the command received from the host computer 34. The control unit 31 provides a virtual volume following a DP function (Thin Provisioning or Dynamic Provisioning). The virtual volume is composed of a plurality of virtual pages.

The hardware configuration of the host computer 34 is similar to a general computer. That is, the host computer 34 has a communication interface, a volatile memory, a non-volatile memory and a CPU coupled thereto.

The external storage system 35 has a similar function as the storage system 30. The communication I/F is a fiber channel I/F for performing communication via the CHA_I/F.

The hardware configuration of the management terminal 33 includes an output device 33a such as a display and a printer, a CPU 33b, a memory 33c composed of a volatile memory and/or a nonvolatile memory, an NIC 33d, and an input device 33e such as a keyboard and a mouse. The management terminal 33 controls the storage system 30 from a remote location or the like via the NIC 33d.

<Storage Tiers>

Figure 4:
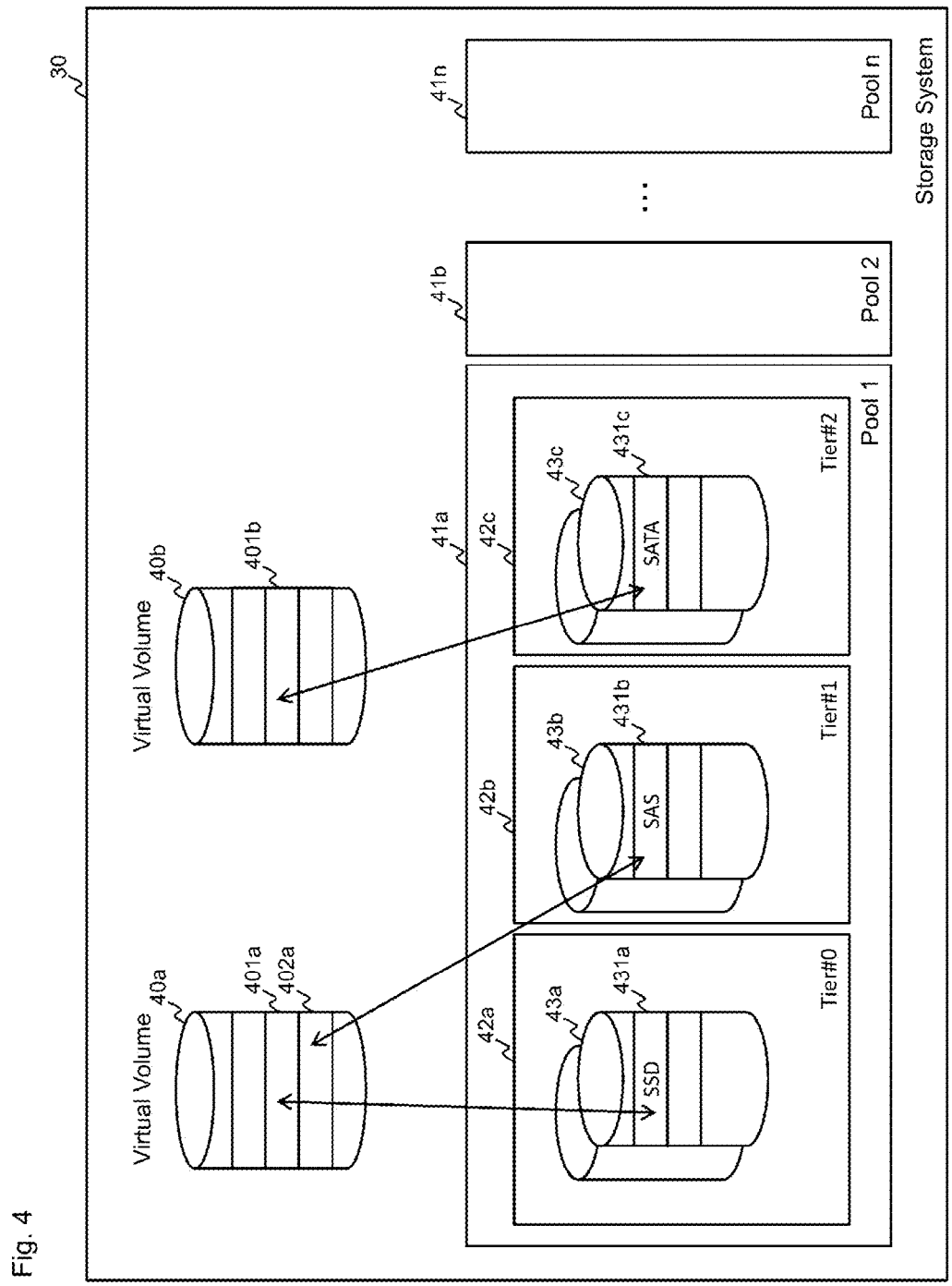
FIG. 4 is a view showing the relationship among various storage areas in the storage system.

FIG. 4 is a view showing the relationship among various storage areas in the storage system.

The storage system 30 includes pool 1 41a, pool 2 41b through pool n 41n, each composed of a plurality of disk volumes.

Each disk volume 43a, 43b and 43c constituting the pools is divided into two or more pool pages 431a, 431b and 431c. Each pool page is a storage area having a predetermined data size. Page numbers are assigned to the pool pages. Each page retains a tier number of the disk volume to which the page belongs, which is selected from Tier #0 42a, Tier #1 42b and Tier #2 42c.

The disk volume 43a is composed of an expensive, high speed SSD as storage drive. Similarly, the disk volume 43b is composed of a SAS type HDD having a lower speed and is inexpensive compared to the SSD. The disk volume 43c is composed of a SATA type HDD that has a lower speed but is inexpensive and has a higher capacity than the SSD.

The storage system 30 comprises virtual volumes 40a and 40b associated with the pools. Multiple virtual volumes are associated with a single pool. For example, virtual volumes 40a and 40b are associated with pool 1 41a.

The virtual volume 40a is composed of a plurality of virtual pages 401a, 402a and the like which are virtual storage areas having a given data size. Similarly, the virtual volume 40b is composed of a plurality of virtual pages 401b and the like which are virtual storage areas having a given data size.

It is possible to interpret the tier number to which the pool page allocated to the virtual page belongs as the tier number to which the virtual page belongs. A pool page is initially allocated when the virtual page is first used (such as when data is written thereto).

The storage system 30 arbitrarily changes the pool page to be allocated to the virtual page so as to optimize the performance of the virtual volume. This changing process is called a "page relocation processing".

For example, a pool page belonging to a high performance disk volume is allocated to a virtual page having a high access load, and a pool page belonging to a relatively low performance disk volume is allocated to a virtual page having a small access load.

In page relocation processing, migration of data among pages is performed. By relocating a pool page allocated to the virtual page based on the tendency of access from the host computer 34, the storage system 30 can provide a high performance virtual volume with respect to the host computer 34.

According to the method of determining the optimum tier number for each pool page, a pool frequency distribution table is referred to, and the virtual pages having higher access frequencies in the past given time zone are set to belong to a tier having a smaller number (that is, having higher performance), and the virtual pages having lower access frequencies are set to belong to a tier having a higher number (that is, having a relatively lower performance).

In the above description, an inbound method in which the virtualization function is provided to the storage system 30 has been described. It is also possible to realize the virtualization function via a server-based inbound system in which the virtualization mechanism (software) is provided to the server or via a switch-based inbound system in which the virtualization mechanism (hardware) is composed of a virtualization switch and a management function. Further, it is possible to adopt an outbound system to realize the virtualization function in which a virtualization software is installed in the host computer and the host computer is directly coupled to the storage system 30.

Further, a remote copy software for copying the same data to an external storage system 35 located at a sufficiently remote location is provided as a software (application) operating in the storage system 30. The remote copy software has a synchronous remote copy function and an asynchronous remote copy function.

An asynchronous remote copy function is a function to transfer a journal (change history) data to a remote site after storing the data in the logical device, thereby creating a replica volume in a different storage system at a remote site (external storage system 35) without passing the host computer, and asynchronously maintaining consistency of the replica volume with a primary volume in a main site The synchronous remote copy function performs update processing of the remote site (external storage system 35) in synchronization with the update processing of the main site (storage system 30), according to which the contents of the primary volume in the main site and the secondary volume in the remote site are constantly matched. A remote copy software has a function to enable both the storage system 30 and the external storage system 35 to be the data copy destination (remote) and the copy source (main).

The storage system 30 also has a software called a local copy software for creating a copy data within the system. The local copy software has two functions, a function to copy the whole data of the primary volume as it is, and a snapshot function to perform backup of only the updated data.

The function to copy the whole data of the primary volume as it is creates a real volume which is a replica of the logical volume (secondary volume), wherein by utilizing the created replica, it becomes possible to acquire a backup without influencing the application in operation and to realize parallel processing of execution of batch operation and the like.

The snapshot function is a function for immediately creating a virtual volume which is a replica of the logical volume (secondary volume) at the time the request is received, which enables to recover data immediately from the replica at an arbitrary point of time when operation mistakes or software failure such as bugs occur.

Further, there is a software that compares file data in file units or in segments units which are smaller than file units when the same file data are stored in the same pool or in the same volume, and eliminates overlapped data (hereinafter called de-duplication).

A database application is also a software that operates in the host computer 34. According to the database application, high-speed response is required for the virtual volume corresponding to the index section, while on the other hand, high-speed response is not required for the virtual volume corresponding to the body section storing real data.

<Allocation Table>

Figure 5:
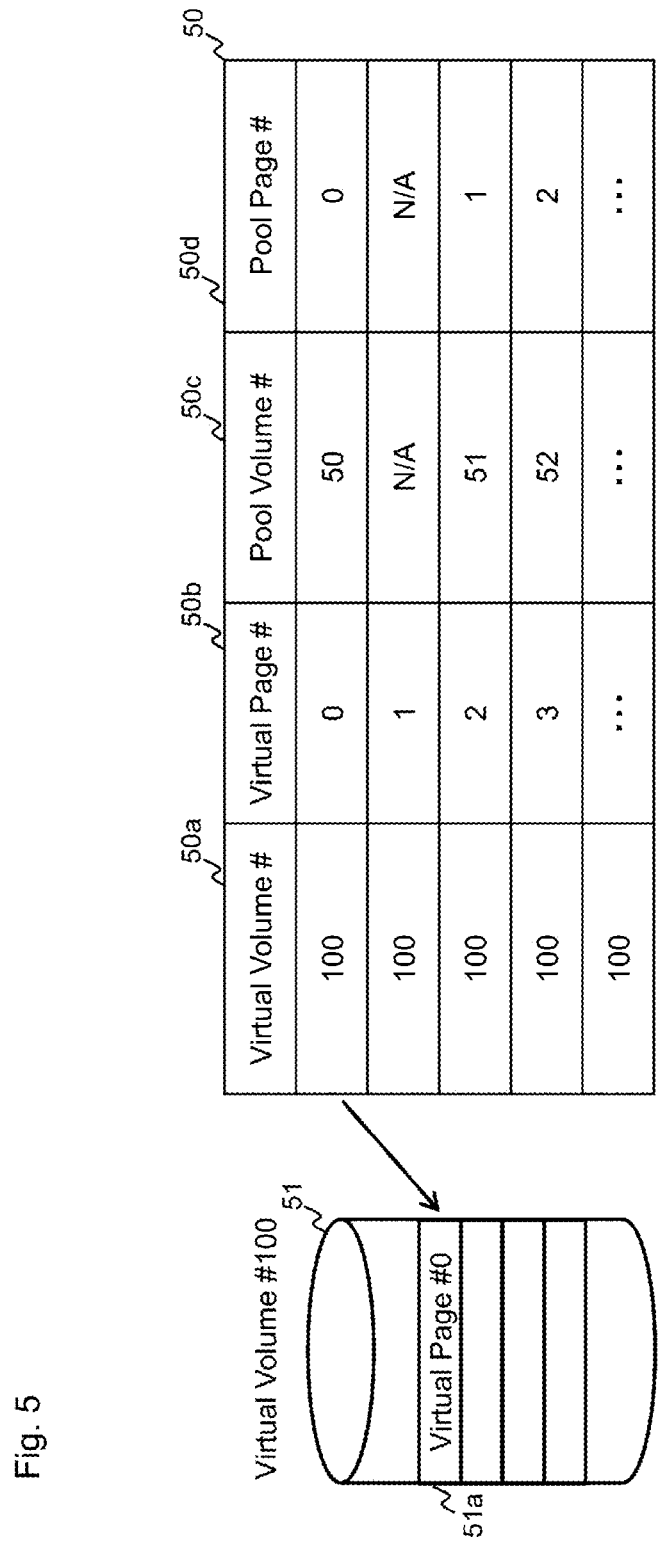
FIG. 5 is a view showing a configuration example of an allocation table.

FIG. 5 is a view showing a configuration example of an allocation table. An allocation table 50 is stored in the memory 31c of the storage system 30, and used arbitrarily by the CPU 31b.

The allocation table 50 is a table showing which pool page is allocated to which virtual page. Actually, the table 50 stores, for each virtual page, a virtual volume #50a, a virtual page #50b, a pool volume #50c, and a pool page #50d.

Taking one virtual page (hereinafter referred to as "targeted virtual page" in the description of FIG. 5) as an example, these information elements are actually the following.

(1) A "virtual volume #" is the number of the virtual volume having the targeted virtual page.

(2) A "virtual page #" is the number of the targeted virtual page.

(3) A "pool volume #" is the number of the pool volume allocated to the virtual volume having the targeted virtual page.

(4) A "pool page #" is the number of the pool page allocated to the targeted virtual page.

In further detail, a targeted virtual page in which the virtual volume #50a is "100" and the virtual page #50b is "0" in the allocation table 50 corresponds to the virtual page #0 51a of virtual volume #100 51, and a pool page in which the pool volume #50c is "50" and the pool page #50d is "0" is allocated thereto.

Similarly, the virtual page in which the virtual volume #50a is "100" and the virtual page #50b is "2" has a pool page allocated thereto in which the pool volume #50c is "51" and the pool page #50d is "1".

A pool page is not allocated to the targeted virtual page in which the virtual volume #50a is "100" and the virtual page #50b is "1" (N/A: Non-Assigned state).

<Pool Volume Management Table>

Figure 6:
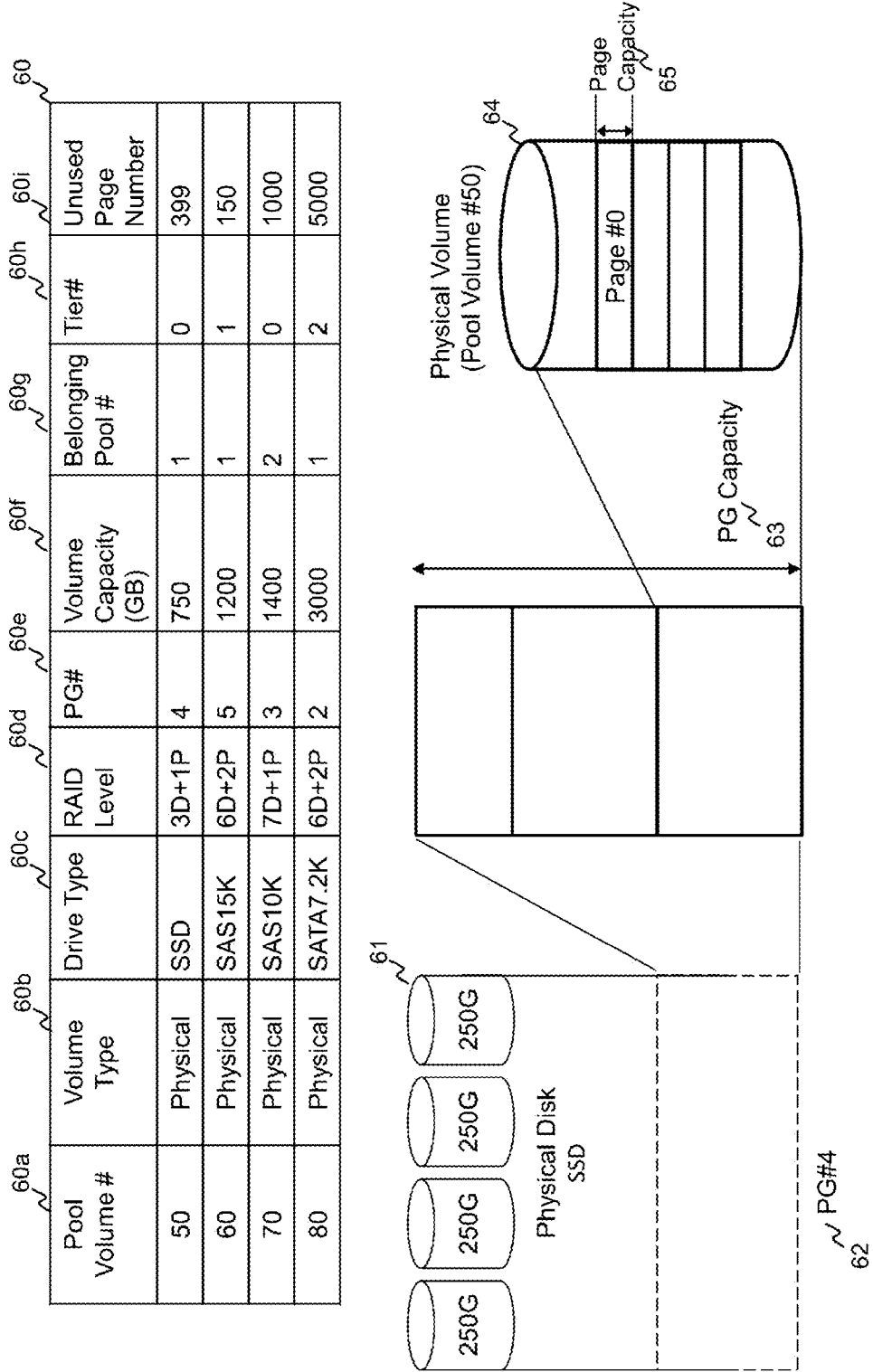
FIG. 6 is a view showing a configuration example of a pool volume management table.

FIG. 6 is a view showing a configuration example of a pool volume management table. A pool volume management table 60 is stored in the memory 31c of the storage system 30, and used arbitrarily by the CPU 31b.

The pool volume management table 60 is for managing the information constituting the pool volume, and manages the storage drive, the RAID level, the capacity and so on.

In other words, the pool volume management table 60 is composed of a pool volume #60a, a volume type 60b, a drive type 60c, a RAID level 60d, a PG # (pool group number) 60e, a volume capacity (GB) 60f, a belonging pool #60g, a tier #60h, and an unused page number 60i.

Taking one pool volume (hereinafter referred to as "targeted pool volume" in the description of FIG. 6) as an example, the above-mentioned information elements are actually as follows.

(1) A "pool volume #" is the number for identifying the targeted pool volume.

(2) A "volume type" is the information for managing the type of the targeted pool volume, which is selected from "physical", "logical" or "virtual".

(3) A "drive type" is the information indicating the type of the storage drive constituting the targeted pool volume.

(4) A "RAID level" is the RAID level number in the targeted pool volume.

(5) A "PG #" is the pool group number for identifying the physical disk (storage drive) constituting the targeted pool volume.

(6) A "volume capacity (GB)" refers to the data storage capacity of the targeted pool volume.

(7) A "belonging pool #" refers to the pool number to which the targeted pool volume belongs.

(8) A "tier #" refers to the tier number showing the tier level of the targeted pool volume.

(9) An "unused page number" refers to the information showing the number of pages in the targeted pool volume not being allocated to the virtual page, that is, unused pages.

In further detail, as shown in the lower half of the drawing, the pool volume #50 in which the pool volume #60a is "50" (reference number 64) can be recognized as a physical volume (reference number 61) composed of SSD having "4" as the PG number (reference number 62) based on volume type 60b, drive type 60c and PG #60e.

Further, it can be recognized based on the RAID level 60d and the volume capacity 60f that the pool volume 50 constitutes RAID5 having a 3D+1P configuration, and the total storage capacity thereof is 750 GB (=250 GB×(3 devices storing data excluding 1 device corresponding to the parity section)) (reference number 63).

Further, it can be recognized based on the belonging pool #60g, the tier #60h and the unused page number 60i that the pool volume 50 belongs to pool 1, the tier is #0 (tier level 0) and there are 399 unused pages. Incidentally, the used pages or the unused pages have a storage capacity of a given page capacity 65, for example, 42 MG/page.

Similarly, the pool volume #60 in which the pool volume #60a is "60" constitutes a RAID level 6 configuration of 6D+2P composed of eight SAS type HDDs having a rotation frequency of 15 Krpm (Kilo root per minutes), which is a physical volume having "5" as the pool group number. It can be recognized that this pool volume 60 belongs to pool 1 of tier #1 (tier level 1), the total storage capacity is 1200 GB, and has 150 unused pages.

The tier # of the pool volume management table 60 is composed of three tiers, from 0 to 2, but it can be of two tiers, or more than four tiers. The drive type used in the respective tiers can be a FC (Fiber Channel) type HDD, an HDD of a NL (Near Line)-SAS of 7.2 Krpm, or a tape.

<Pool Page Management Table>

FIG. 7 is a view showing a configuration example of a pool page management table. The pool page management table 70 is stored in the memory 31c of the storage system 30 and used arbitrarily by the CPU 31b.

The pool page management table 70 is a table for managing the states of the respective pool pages. The pool page management table 70 is composed of, for each pool page, a pool volume #70a, a pool page #70b and a page used state 70c.

One pool page (hereinafter referred to as "targeted pool page" in the description of FIG. 7) is taken as an example to described the aforementioned information elements.

(1) A "pool volume #" refers to the number for identifying the pool volume having the targeted pool page.

(2) A "page #" is the number of the targeted pool page.

(3) A "page used state" is the information showing the used state of the targeted pool page. The information of the used state includes, for example, "used" and "unused".

The "used" state means that the targeted pool page is already allocated to a virtual page. The "unused" state means that the targeted pool page is not allocated to any virtual page, and therefore, the page is in a state allocatable to any virtual page.

Actually, the page #0 of pool volume #50 having "50" as the pool volume # is in a used state. In contrast, page #2 of pool volume #50 is unused, so it is in a state allocatable to any virtual page.

<Virtual Page I/O Count Management Table>

FIG. 8 is a view showing the configuration example of a virtual page I/O count management table. The virtual page I/O count management table 80 is stored in the memory 31c of the storage system 30, and used arbitrarily by the CPU 31b.

The virtual page I/O count management table 80 is a table for managing the number of I/Os generated for each virtual page of the virtual volume, which is referred to by the aforementioned DT function and used to change the tier level of a pool page allocated to the virtual page. The virtual page I/O count management table 80 is composed of a virtual volume #80a, a virtual page #80b, and an I/O count per virtual page 80c for managing the number of I/Os generated for each virtual page.

One virtual page (hereinafter referred to as "targeted virtual page" in the description of FIG. 8) is taken as an example to describe the aforementioned information elements.

(1) A "virtual volume #" is the number for identifying the virtual volume having the targeted virtual page.

(2) A "virtual page #" is the number of the targeted virtual page.

(3) An "I/O count per virtual page" is the total number of I/Os generated for the targeted virtual page.

Actually, the I/Os generated in a virtual page #0 in which the virtual volume #80a is "100" and the virtual page #80b is "0" is, as shown in the I/O count per virtual page 80c, "10".

Similarly, it can be seen that no I/O has been generated to virtual page #1 of the virtual volume #100, as shown by "0" in the I/O count per virtual page 80c.

Moreover, it can be recognized from the virtual page I/O count management table 80 that the values of I/O count generated in virtual page #2 of the virtual volume #100 is as high as "512" and the I/O count generated in virtual page #0 of the virtual volume #104 is as high as "635".

<Write I/O Processing>

Figure 9:
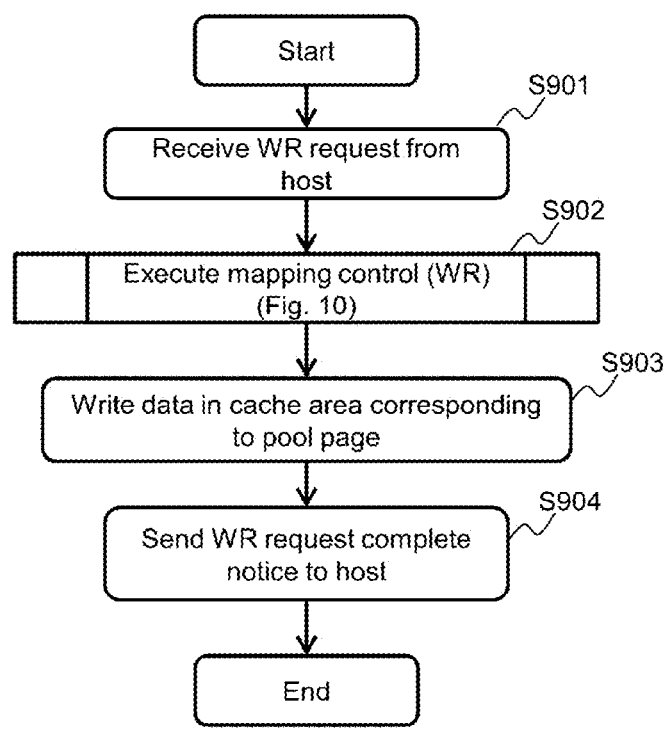
FIG. 9 is a flowchart showing the processing of a write I/O request from the host computer.
Figure 10:
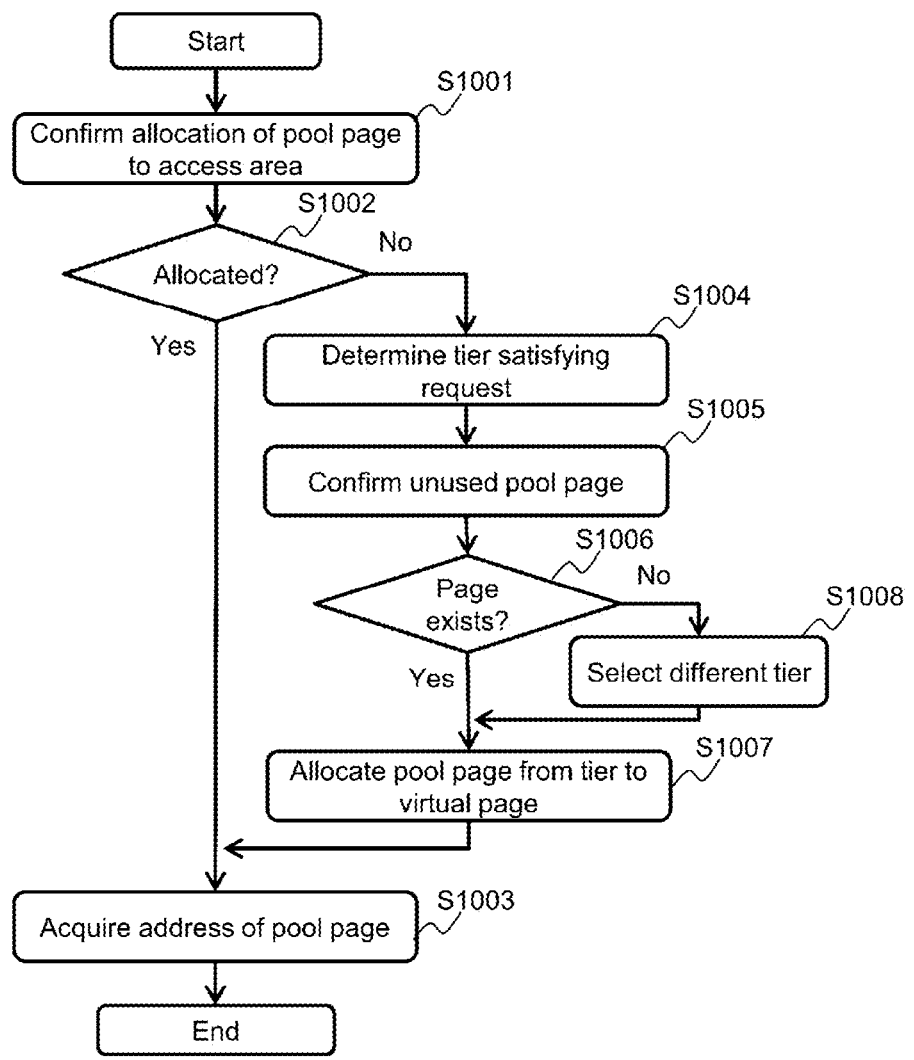
FIG. 10 is a flowchart showing a mapping process of the storage area when a write I/O request is received.

FIG. 9 is a flowchart showing the processing of a write I/O request from the host computer. FIG. 10 is a flowchart showing a mapping process of the storage area when a write I/O request is received.

For convenience of description, the following processes are described so that the CPU 31b of the storage system 30 executes the processes. The processes can also be described so that the program operating on the CPU 31b, such as the program having the aforementioned DP function or the DT function, executes the processes.

The processes of FIG. 9 and FIG. 10 are executed by the CPU 31b, triggered by the generation of the write I/O request from the host computer 34 to the storage system 30.

In S901, the CHA_I/F 31a of the storage system 30 receives a write I/O request from the host computer 34 via the network 36. The CHA_I/F 31a transfers the received write I/O request (write command, write destination address and write data) to the CPU 31b.

In S902, the CPU 31b executes the processing of a mapping control (WR) shown in FIG. 10.

In S1001 of FIG. 10, the CPU 31b confirms the pool page allocation status to the write destination virtual page via the allocation table 50 (FIG. 5).

In S1002, the CPU 31b determines whether a pool page has been allocated to the write destination virtual page or not.

When a pool page is already allocated to the virtual page (S1002: Yes), the CPU 31b executes S1003. When a page is not allocated (S1002: No), the CPU 31b executes the process of S1004.

In S1003, the CPU 31b acquires the address information of the pool page (pool volume number, page number) allocated to the write destination virtual page from the pool volume management table 60 and the pool page management table 70.

When a pool page is newly allocated to the write destination virtual page, the CPU 31b updates the allocation table 50 using the address information (pool volume number, pool page number) of the acquired pool page. Actually, the CPU 31b changes the contents of the field of the pool volume #50c and the pool page #50d on the rows of the virtual volume number and the virtual page number based on the acquired pool volume number and the page number.

In S1004, the CPU 31b determines the tier satisfying the write I/O request. For example, it sets the tier to Tier 0.

In S1005, the CPU 31b determines the pool volume corresponding the tier determined in S1004 based on the pool volume management table 60. Next, the CPU 31b confirms the unused pool pages in the determined pool volume via the pool page management table 70.

In S1006, the CPU 31b determines whether an unused pool page exists in the pool volume or not. If there is an unused pool page (S1006: Yes), the CPU 31b executes S1007. If there is no unused pool page (S1006: No), the CPU 31b executes S1008.

In S1007, the CPU 31b selects and allocates a pool page to be allocated to the virtual page from the pool page corresponding to the determined tier. Actually, if the tier is determined to be Tier 0, the CPU 31b selects a pool volume #50 in the pool volume management table 60. The CPU 31b selects page #2 which is a pool page in an unused state in the pool volume #50 via the pool page management table 70. The CPU 31b updates the page used state 70c in the pool page management table 70 corresponding to the selected page #2 from "unused" to "used".

In S1008, the CPU 31b selects a different tier, and for example, if the pool is of a same Tier 0, a pool volume #70 is selected from the pool volume management table 60. The CPU 31b executes S1007 and S1003 after selecting a pool page in an unused state of pool volume #70 in the pool page management table 70.

Now, the process of FIG. 9 will be described again.

The CPU 31b executes S903 after completing the mapping control (WR) process in S902.

In S903, the CPU 31b writes the write data into the cache memory area of the memory 31c corresponding to the address information (pool volume number, pool page number) of the acquired pool page.

In S904, the CPU 31b sends a write complete notice to the host computer 34.

As described, the storage system 30 is capable of processing the write I/O request from the host computer 34, including the allocation of a pool page to the virtual page.

<Destaging Process>

Figure 11:
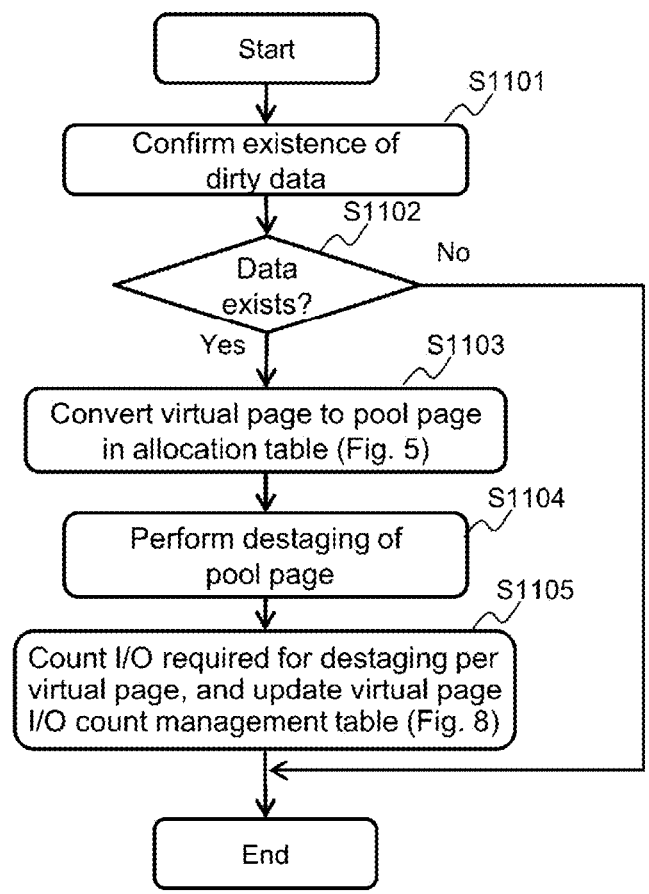
FIG. 11 is a flowchart showing the destaging process from the memory to the storage drive.

FIG. 11 is a flowchart showing the destaging process from the memory to the storage drive.

In S1101, the CPU 31b confirms whether there is dirty data that exists only in the memory and not stored in the storage drive in the cache memory area of the memory 31c.

In S1102, the CPU 31b determines whether dirty data exists. If dirty data exists in the cache memory area of the memory 31c (S1102: Yes), the CPU 31b executes S1103. If there is no dirty data (S1102: No), the CPU 31b ends the destaging process.

In S1103, the CPU 31b converts the address information of the virtual page (virtual volume number, virtual page number) to the address information of the pool page (pool volume number, pool page number) in the allocation table 50.

In S1104, the CPU 31b executes a destaging operation of writing dirty data into a predetermined area of the storage drive corresponding to the converted pool page.

In S1105, the CPU 31b counts the number of I/Os required for the destaging operation per virtual page, and updates the virtual page I/O count management table 80.

Actually, regarding the virtual page #0 of the virtual volume #100, it can be seen from the allocation table 50 that the corresponding pool volume is #50 and the pool page is #0.

Further, it can be seen from the pool volume management table 60 that the pool volume #50 is composed of a physical disk 61 in which the drive type is SSD.

Therefore, the CPU 31b writes dirty data via the SAS_I/F 31e into the predetermined area of the SSD 61 which is a physical disk.

Then, the CPU 31b adds the number of I/Os required for the destaging operation to the contents of the I/O count per virtual page 80c in which the virtual volume #80a is "100" and the virtual page #80b is "0" in the virtual page I/O count management table 80.

The number of I/Os required for the destaging operation is measured via the SAS_I/F 31e, and the measured result is acquired by the CPU 31b, by which the virtual page I/O count management table 80 is updated.

Further, if the destaging destination is the SAS type HDD 32b or the SATA type HDD 32c, the number of I/Os required for destaging is measured respectively via the SAS_I/F 31f or the SATA_I/F 31g.

For example, if the number of I/Os required for the destaging operation is "5", the CPU 31b updates the contents of the I/O count per virtual page 80c by the number "15" which is acquired as a result of adding "5" to the number "10" which is the content of the I/O count per virtual page 80c.

<Read I/O Processing>

Figure 12:
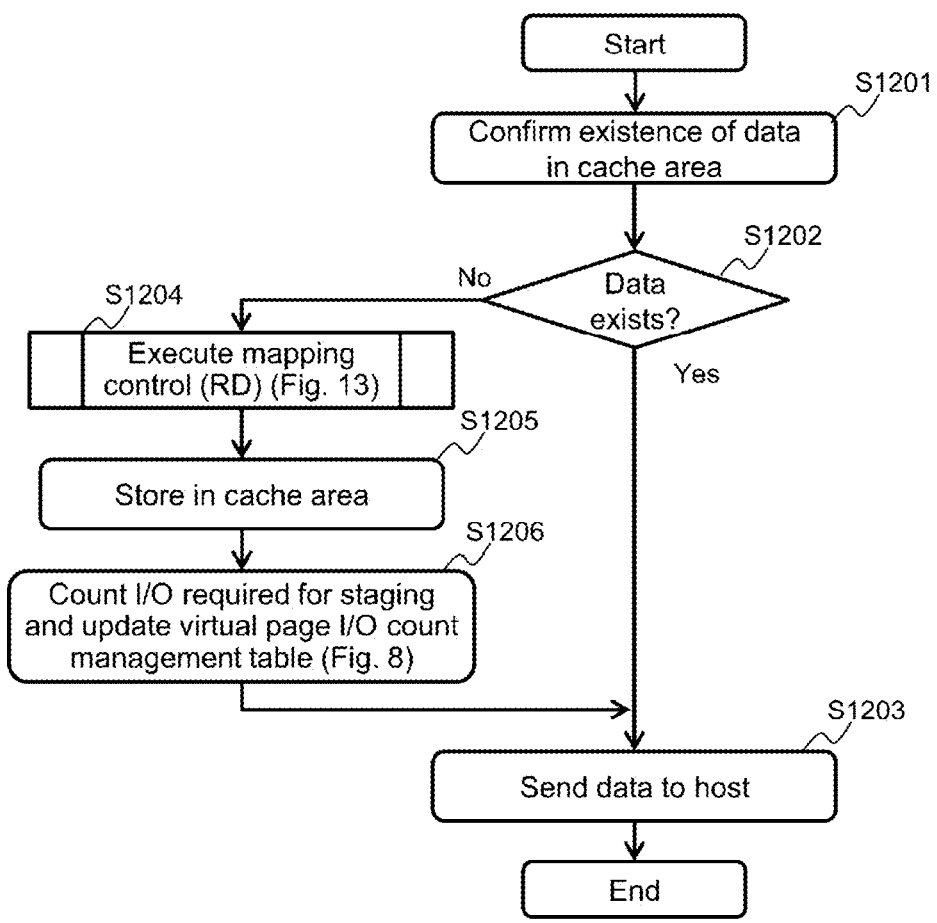
FIG. 12 is a flowchart showing the processing of the read I/O request from the host computer.
Figure 13:
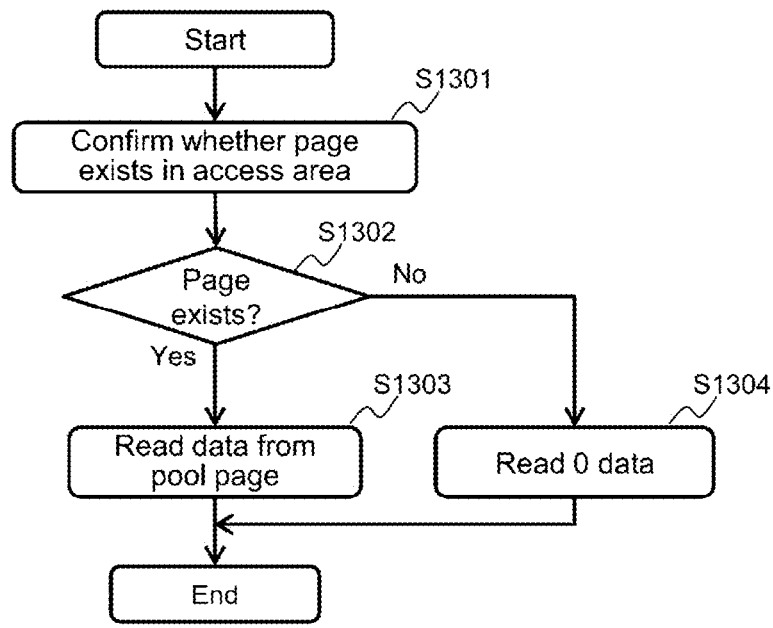
FIG. 13 is a flowchart showing the mapping process of the storage area when a read I/O request is received.

FIG. 12 is a flowchart showing the processing of the read I/O request from the host computer. FIG. 13 is a flowchart showing the mapping process of the storage area when the read I/O request is received.

The processes of FIG. 12 and FIG. 13 are executed by the CPU 31b when a read I/O request occurs from the host computer 34 to the storage system 30.

In S1201, the CPU 31b confirms whether read data exists in the cache memory area in the memory 31c or not.

In S1202, the CPU 31b determines whether data to be read exists in the cache memory area or not. If data exists (S1202: Yes), the CPU 31b executes S1203. If no data exits (S1202: No), the CPU 31b executes the process of S1204.

In S1203, the CPU 31b reads the data to be read from the cache memory area of the memory 31c, sends the data to the host computer 34, and completes the read I/O request processing.

If no data to be read exists in the cache memory area, in S1204, the CPU 31b executes the mapping control (RD) process of FIG. 13.

In S1301, the CPU 31b confirms via the allocation table 50 whether there is an allocated pool page to the virtual page of the read access area.

In S1302, the CPU 31b determines whether there is a pool page or not. If there is a pool page allocated to the virtual page of the read access area (S1302: Yes), the CPU 31b executes S1303, and if there is no pool page (S1302: No), the CPU 31b executes S1304.

In S1303, the CPU 31b reads data from the pool page, and completes the processing of the mapping control (RD).

In S1304, the CPU 31b reads in 0 data, and completes the processing of the mapping control (RD).

Now, the process of FIG. 12 will be described again.

In S1205, if the data having been read is other than 0 data, the CPU 31b stores the read data into the cache memory area in the memory 31c.

In S1206, the CPU 31b counts the number of I/Os required for staging, and using the counted value, updates the contents of the I/O count per virtual page 80c. This update operation is the same as the update operation described in S1105 of FIG. 11.

Lastly, in S1203, the CPU 31b sends the data read from the pool page or the 0 data to the host computer 34, and the storage system 30 completes the processing of the read I/O request from the host computer 34.

<Determination of Optimum Tier>

Figure 14:
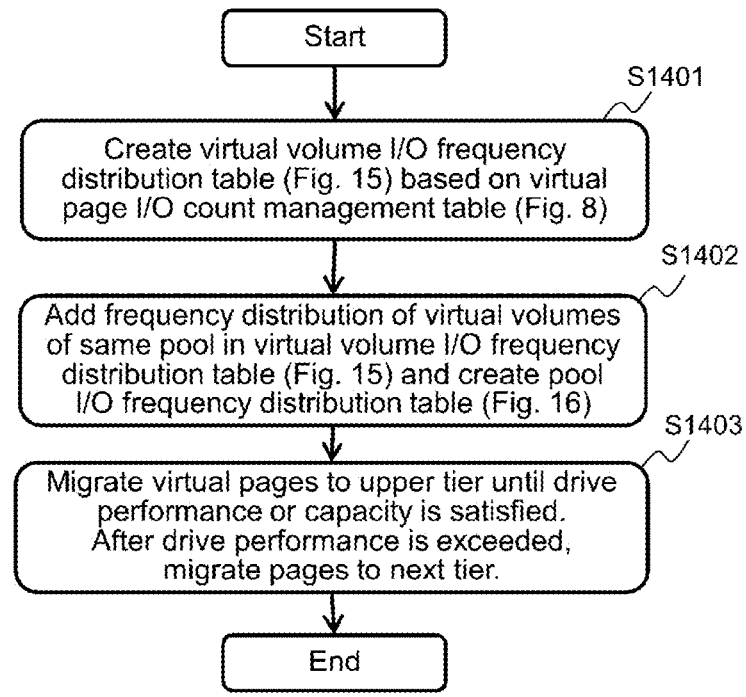
FIG. 14 is a flowchart showing the process for determining the optimum tier.

FIG. 14 is a flowchart showing the process for determination the optimum tier.

In S1401, the CPU 31b creates a virtual volume I/O frequency distribution table (FIG. 15) based on the virtual page I/O count management table 80 (FIG. 8).

In S1402, the CPU 31b creates a pool I/O frequency distribution table (FIG. 16) by adding the I/O frequency distributions per virtual volume belonging to the same pool. Then, a frequency distribution graph per page a1 (FIG. 17 (a)) is created in which the horizontal axis shows the I/O count and the vertical axis shows the number of pages of the contents of the pool I/O frequency distribution table. Then, the created frequency distribution graph per page a1 is converted to create a frequency distribution graph per page b1 (FIG. 17 (b)) in which the horizontal axis shows the storage capacity and the vertical axis shows the IOPS.

In S1403, the CPU 31b allocates the virtual pages in the upper tier until the drive performance or the tier capacity shown in Expression 1 is satisfied. The CPU 31b allocates the virtual pages after the drive performance has been exceeded to the next tier (same level or lower level tier) to. This is because the performance cannot be improved even if the virtual page is allocated to the pool page of the tier having exceeded the drive performance.

Drive Performance=Performance per unit capacity of drive (Expression 2)×Pool volume capacity× Coefficient (60%)           Expression 1

Performance per unit capacity of drive=Drive limit performance/Drive capacity           Expression 2

Further, the coefficient (60%) of Expression 1 is for preventing the total capacity of the drive from being increased continuously (the number of added drives being increased) even after the drive performance has saturated.

In the above-described process, an inbound system in which the virtualization function is provided in the storage system 30 has been described. It is also possible to perform the aforementioned process by the aforementioned inbound system of the server base, the inbound system of the switch base, or the outbound system using the virtualization function.

<Virtual Volume I/O Frequency Distribution Table>

FIG. 15 is a view showing a configuration example of the virtual volume I/O frequency distribution table. The virtual volume I/O frequency distribution table 150 is stored in the memory 31c of the storage system 30 and used arbitrarily by the CPU 31b.

The virtual volume I/O frequency distribution table 150 is for managing the number of I/Os generated per virtual volume.

The virtual volume I/O frequency distribution table 150 is composed of a virtual volume #150a, an I/O count range 150b, a page count 150c, and a cumulative I/O count per I/O count range 150d.

Taking one virtual volume (hereinafter referred to as "targeted virtual volume" in the description of FIG. 15) as an example, the aforementioned information elements are as follows.

(1) A "virtual volume #" is a number for identifying the targeted virtual volume.

(2) An "I/O count range" shows the range of the I/O count generated in the targeted virtual volume. The notation "X-Y" shows that the generated I/O is in the range of X times to Y times.

For example, "15-31" shows that the generated I/O falls within the range of 15 to 31 times. Incidentally, "0-0" shows that the number of I/Os is zero, and "1-1" shows that the number of I/Os is one. The I/Os can also be managed not by the range of the number of I/Os but by single I/O units.

(3) A "page count" refers to the number of virtual pages having the I/O correspond to the range of the I/O count in the targeted virtual volume.

For example, if there are 60 pages of virtual pages in which the generated I/O count is "2" within the virtual pages of the virtual volume #0, and if there are 81 pages of virtual pages in which the generated I/O count is "3", the number of pages 150c in which the I/O count range 150b of the virtual volume #0 is "2-3" will be a total of the two values, or 141 pages.

(4) A "cumulative I/O count per I/O count range" is the cumulative I/O count calculated by totalizing the number of I/Os generated for each I/O count range in the targeted virtual volume.

<Pool I/O Frequency Distribution Table>

Figure 17:
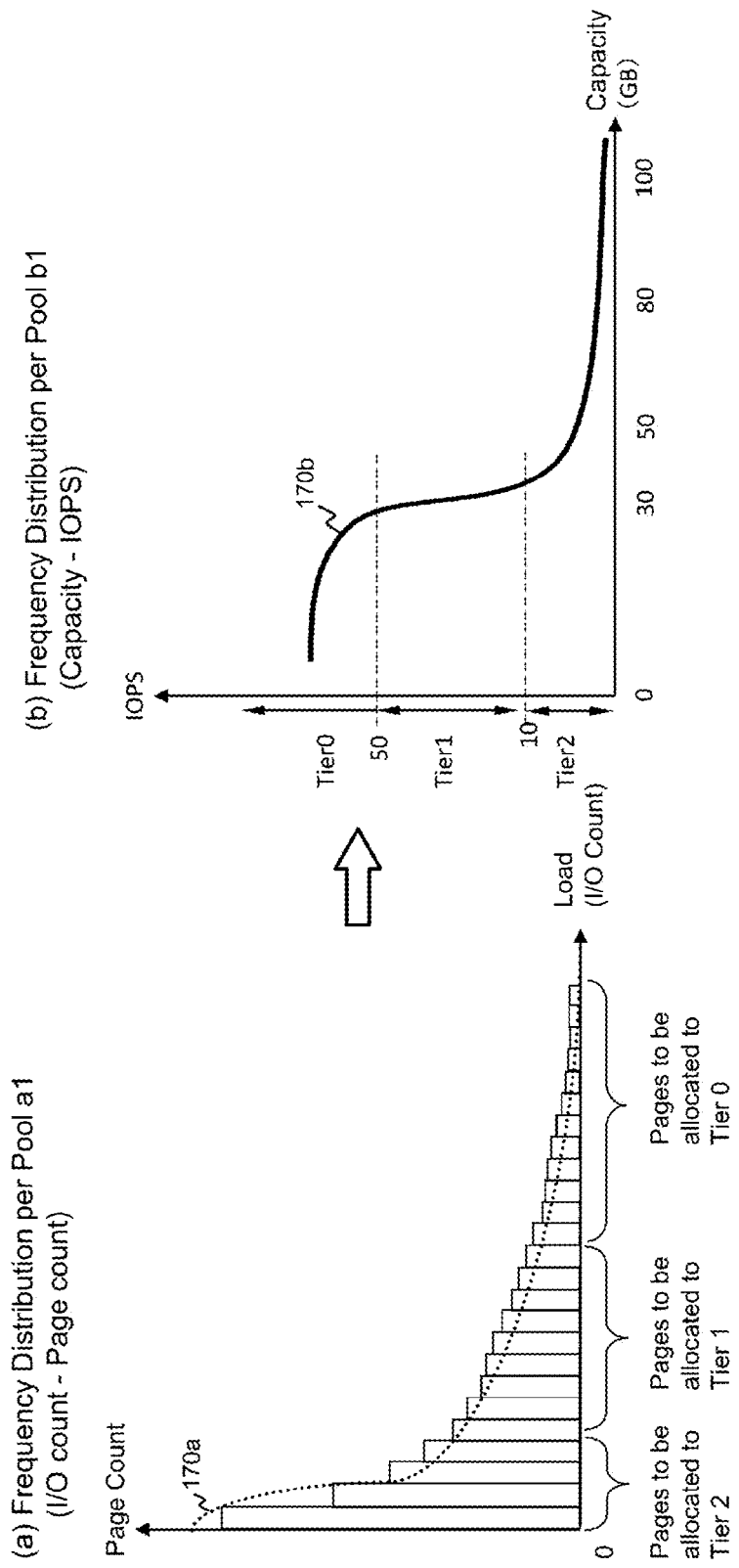
FIG. 17 is a view showing an image of frequency distribution per pool.

FIG. 16 is a view showing a configuration example of a pool I/O frequency distribution table. FIG. 17 is a view showing an image of the frequency distribution per pool.

A pool I/O frequency distribution table 160 is for managing the number of I/Os generated for each pool, which is stored in the memory 31c of the storage system 30 and used arbitrary by the CPU 31b.

The pool I/O frequency distribution table 160 is composed of a pool #160a, an I/O count range 160b, a page count 160c, and a cumulative I/O count 160d per I/O count range.

Taking a single pool (hereinafter referred to as "targeted pool" in the description of FIG. 16) as an example, the aforementioned information elements are as follows.

(1) A "pool #" is the number for identifying the targeted pool.

(2) An "I/O count range" is the range of the I/O count generated in the targeted pool.

(3) A "page count" is the total number of pool pages matching the range of the I/O count generated in the targeted pool.

(4) A "cumulative I/O count per I/O count range" is the cumulative I/O count calculated by totalizing the I/O counts generated for each I/O count range in the targeted pool.

The notation system and notation content of the above-mentioned (2) to (4) is the same as FIG. 15. Further, it is possible to add the I/O frequency distribution of each virtual volume belong to each pool to create the pool I/O frequency distribution table 160.

<Frequency Distribution Graph Per Pool>

FIG. 17 is a view showing an image of a frequency distribution per pool.

The method for creating a frequency distribution graph per pool using the pool I/O frequency distribution table 160 will be described with reference to FIG. 17. For sake of description, it is assumed that the number of pools is one.

At first, a bar graph is created showing the I/O count and the total number of pages per I/O count range using the pool I/O frequency distribution table 160. Then, in the created bar graph, the bars are rearranged in the order from those having a small number of I/Os to those having a large number of I/Os from left to right.

For example, the bar graph on the left end in FIG. 17(a) has assembled the pages in which the I/O count is "0", wherein the number of pages thereof is 1000 pages. It is assumed that the second bar graph has assembled the pages in which the I/O count is "1", wherein the number of pages thereof is 800 pages. The third bar graph has assembled the pages in which the I/O count is "2", wherein the number of pages is 700. As described, the bar graphs are arranged in order from left to right so that the bar graphs having smaller I/O counts are arranged from the left and the bar graphs having greater I/O counts are arranged toward the right.

As the number of generated I/Os increases, the number of pages accessed by that I/O count decreases. Therefore, the pool I/O frequency distribution a shown by the I/O count representing the load and the page count (curved line connecting the tops of the respective bar graphs) is as shown by reference number 170a.

Further, the tier level allocated to each page can be computed by number of loads and the drive capacity of the storage drive (physical disk) allocated to each tier.

For example, in FIG. 17(a), the pages having a high load, that is, the pages of the bar graphs from the bar graph on the right end side to the 12th bar graph are pages to be allocated to Tier 0. Similarly, the pages of the bar graphs from the 13th bar graph to the 21st bar graph the right are pages to be arranged to Tier 1, and the pages of the bar graphs from the 22nd bar graph to the 24th bar graph (from the left end bar graph to the fourth bar graph) are pages to be arranged to Tier 2.

Next, the created frequency distribution graph per page a1 (reference number 170a) is converted to create a frequency distribution graph per page b1 (FIG. 17(b)) in which the horizontal axis shows the storage capacity and the vertical axis shows the IOPS.

The above-described operation enables to create the aforementioned pool frequency distribution graph (capacity—IOPS).

<<Embodiment 1>>
<<Outline>>

The storage system 30 according to embodiment 1 has the following functions (1) and (2).

(1) Function to perform grouping of multiple virtual volumes belonging to the same pool The group of virtual volumes formed into a group is called TG (Tiering Group).

(2) Function to set up constraint condition of amount of use per tier of each TG The setting items of the constraint condition are a Tier 0 minimum capacity ensuring the minimum amount of use of Tier 0, a Tier 0 maximum capacity determining the maximum amount of use of Tier 0, and a Tier 2 minimum capacity determining the minimum amount of use of Tier 2.

According to the present embodiment, the case of setting the constraint condition of the above-mentioned three amounts of use will be described. However, the present invention is not restricted to such example, and the present invention can also set the maximum amount of use of Tier 2, the minimum amount of use of Tier 1 and the maximum amount of use of Tier 1, execute the page relocation processing described later, and reduce the influence to the response performance.

Further, the number of tiers in the embodiment is three (three tiers), but the number of tiers can be two, or more than four tiers.

At first, the user or the system administrator performs the TG setting with respect to the created plurality of virtual volumes. In the TG setting, the group of virtual volumes to be subjected to grouping is registered per TG, and the constraint condition per TG is set up.

The grouping is performed per purpose of use of the virtual volume. For example, if the virtual volume belonging to a pool is used in the database application operating in the host computer 34, the virtual volume group used for the index section and the virtual volume group used for the body section storing the actual data are each formed as a TG.

According to the database application, the virtual volume constituting the index section is required to realize a high speed response, while the virtual volume constituting the body section storing the actual data is not required to realize a high speed response.

Therefore, if the virtual volume of the index section and the virtual volume of the body section storing actual data are in the same TG, the access performance will be deteriorated. Therefore, the respective virtual volumes are registered as different TGs and detailed allocation of tiers is executed, according to which the response performance of the storage system can be improved.

The virtual volume group to be subjected to grouping and the constraint condition, which are the Tier 0 minimum capacity, the Tier 0 maximum capacity and the Tier 2 minimum capacity, are set up by the user or the system administrator via the management terminal 33.

Next, a frequency distribution per virtual volume is created from the virtual page I/O count management table. By adding the frequency distribution of the virtual volume belonging to the same TG based on this table, a frequency distribution per TG is created.

The virtual page to be migrated to Tier 0 is determined based on the created frequency distribution per TG of each TG and the Tier 0 minimum capacity set up in advance.

Similarly, the virtual page to be migrated to Tier 2 is determined based on the frequency distribution per TG of each TG and the Tier 2 minimum capacity.

Next, a frequency distribution per pool is created by adding the frequency distribution per TG of the TGs belonging to the same pool, and the pages other than the already migrated pages are migrated to the upper tier sequentially from the virtual pages having higher I/O counts until the drive performance or the tier capacity is satisfied. Further, the next tier is selected when the drive performance or the tier capacity is exceeded, and migration is performed similarly.

When the migration of all virtual pages is completed, whether the amount of use of Tier 0 of each TG has exceeded the Tier 0 maximum capacity set in advance or not is checked, and if exceeded, the virtual page is switched with the virtual page allocated to Tier 1 belonging to a TG other than the present TG.

Here, the virtual pages to be switched are the virtual page having the least I/O count in the virtual pages allocated to Tier 0 of the present TG and the virtual page having the most I/O count in the virtual pages allocated to Tier 1 other than the present TG.

When all the TGs satisfy the constraint condition of the maximum amount of use of Tier 0, the relocation of pages is completed.

As described, by setting the constraint condition of the amount of user of the tier for each TG, each TG is capable of using the upper level Tier 0 regardless of the I/O count, so that the influence of load variation of other TGs can be reduced. Further, by performing TG per virtual volume used for each application, it becomes possible to reduce the influence to response performances among applications.

<<Page Relocation Processing>>

Figure 18:
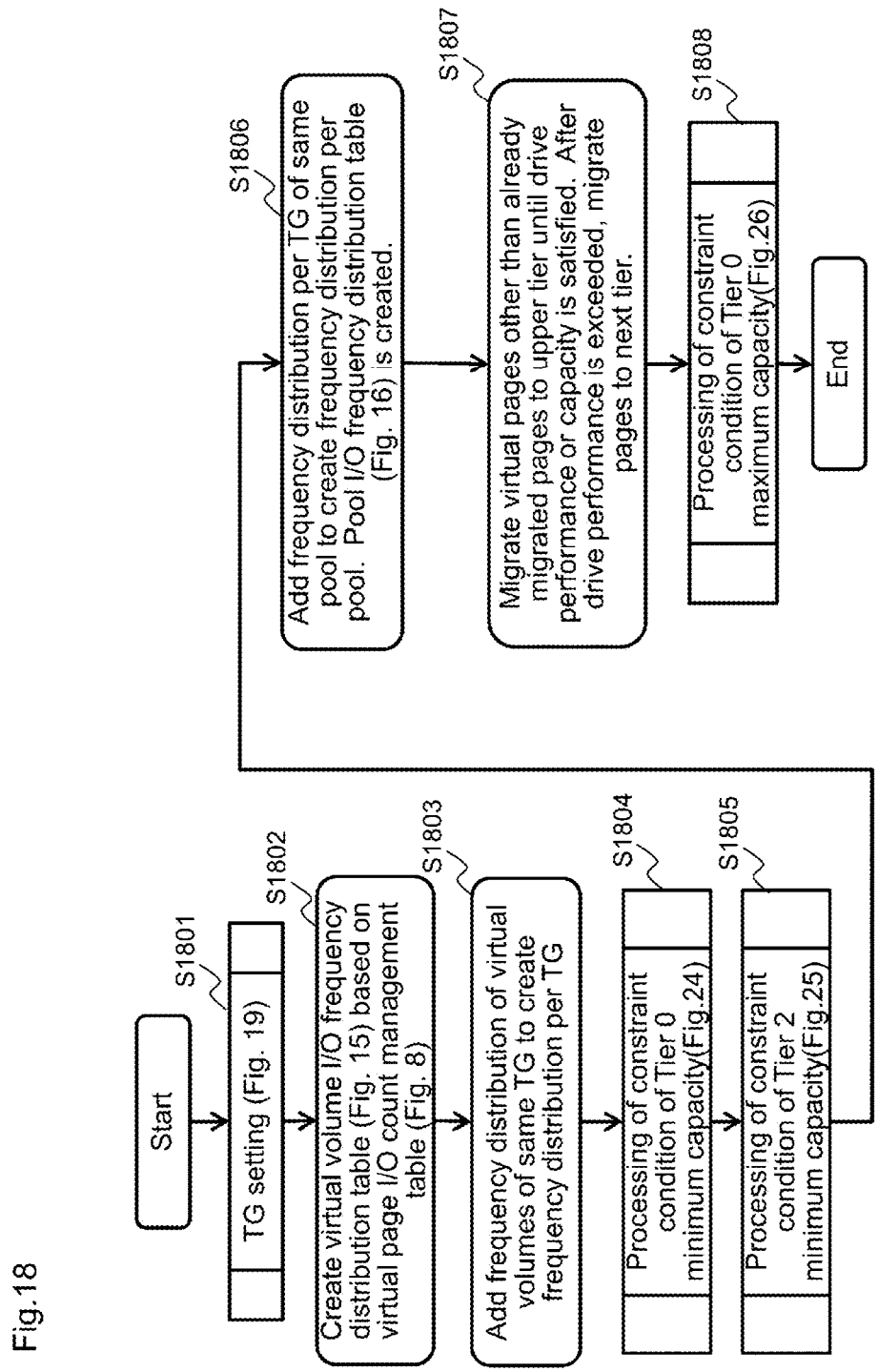
FIG. 18 is a flowchart showing a page relocation processing for setting constraint conditions per TG according to embodiment 1.
Figure 19:
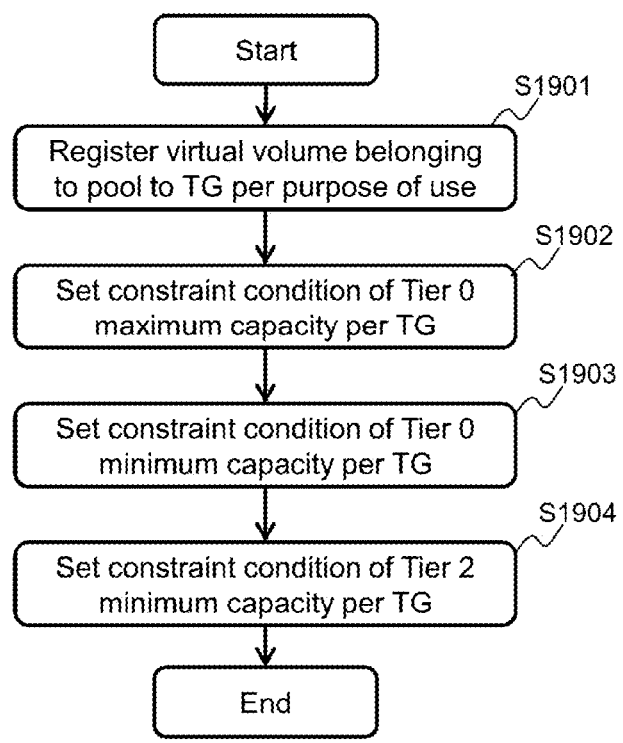
FIG. 19 is a flowchart showing a TG setting process according to embodiment 1.

FIG. 18 is a flowchart showing a page relocation processing for setting constraint conditions per TG according to embodiment 1. FIG. 19 is a flowchart showing a TG setting process according to embodiment 1. FIG. 20 is a view showing a configuration example of a TG setting information management table according to embodiment 1.

In S1801, the CPU 31*b* executes the TG setting process shown in FIG. 19.

<TG Setting/TG Setting Information Management Table 1>

In the processes of S1901 to S1904 of FIG. 19, the predetermined information is set for the TG setting items shown in FIG. 20.

The TG setting information management table 200 is composed of a POOL #200*a*, a TG #200*b*, a virtual volume #200*c* belonging to each TG, and a constraint condition (capacity of use (GB)) 200*d*.

Taking a single TG as an example (hereinafter referred to as "target TG" in the description of FIG. 20), the aforementioned information elements are as follows.

(1) A "POOL #" refers to the number for identifying the pool to which the target TG belongs. One or more TGs belong to each pool.

(2) A "TG #" is the group number for identifying the target TG.

(3) A "virtual volume # belonging to each TG" is the information for identifying the virtual volume belonging to the target TG. One or more virtual volumes belong to a single TG.

(4) A "constraint condition" is set by setting the Tier 0 maximum capacity, the Tier 0 minimum capacity and the Tier 2 minimum capacity of the target TG. A capacity (GB) value is set for each setting field, but "not set" refers to the state where no value has been set, and "-" refers to the state where the capacity cannot be set.

For example, it can be seen that the TG #0 of POOL #0 in which the POOL #200*a* is "0" and the TG #200*b* is "0" has three virtual volumes of numbers 0, 1 and 2 belong thereto as shown in the virtual volume #200*c* belonging to each TG. Further, it can be seen based on constraint condition 200*d* that the Tier 0 maximum capacity is set to 30 GB, and the Tier 0 maximum capacity and the Tier 2 minimum capacity are not set.

At first, in S1901 (FIG. 19), the CPU 33*b* of the management terminal 33 acquires the information of the virtual volumes being subjected to grouping as TG for each purpose of use which is entered by a user or a system administrator via an input device 33*e* such as a keyboard on a setup screen displayed on an output device 33*a* such as a display.

In S1902, the CPU 33*b* acquires the constraint condition of the Tier 0 maximum capacity for each TG set by the user or the system administrator, similar to the information on the virtual volumes subjected to grouping per purpose of use.

In S1903, the CPU 33b acquires the constraint condition of the Tier 0 minimum capacity for each TG set by the user or the system administrator, similar to the information on the virtual volumes subjected to grouping per purpose of use.

In S1904, the CPU 33b acquires the constraint condition of the Tier 2 minimum capacity for each TG set by the user or the system administrator, similar to the information on the virtual volumes subjected to grouping per purpose of use.

After acquiring the constraint condition of the Tier 2 minimum capacity, the CPU 33b assembles the various information being acquired as a TG setting information management table 200. Then, the CPU 33b sends the assembled TG setting information management table 200 via the NIC 33d to the storage system 30.

The CPU 31b of the storage system 30 acquires the TG setting information management table 200 transmitted from the management terminal 33 via the NIC 31d, and stores the same in the shared memory area on the memory 31c.

<New Setting of TG>

Figure 21:
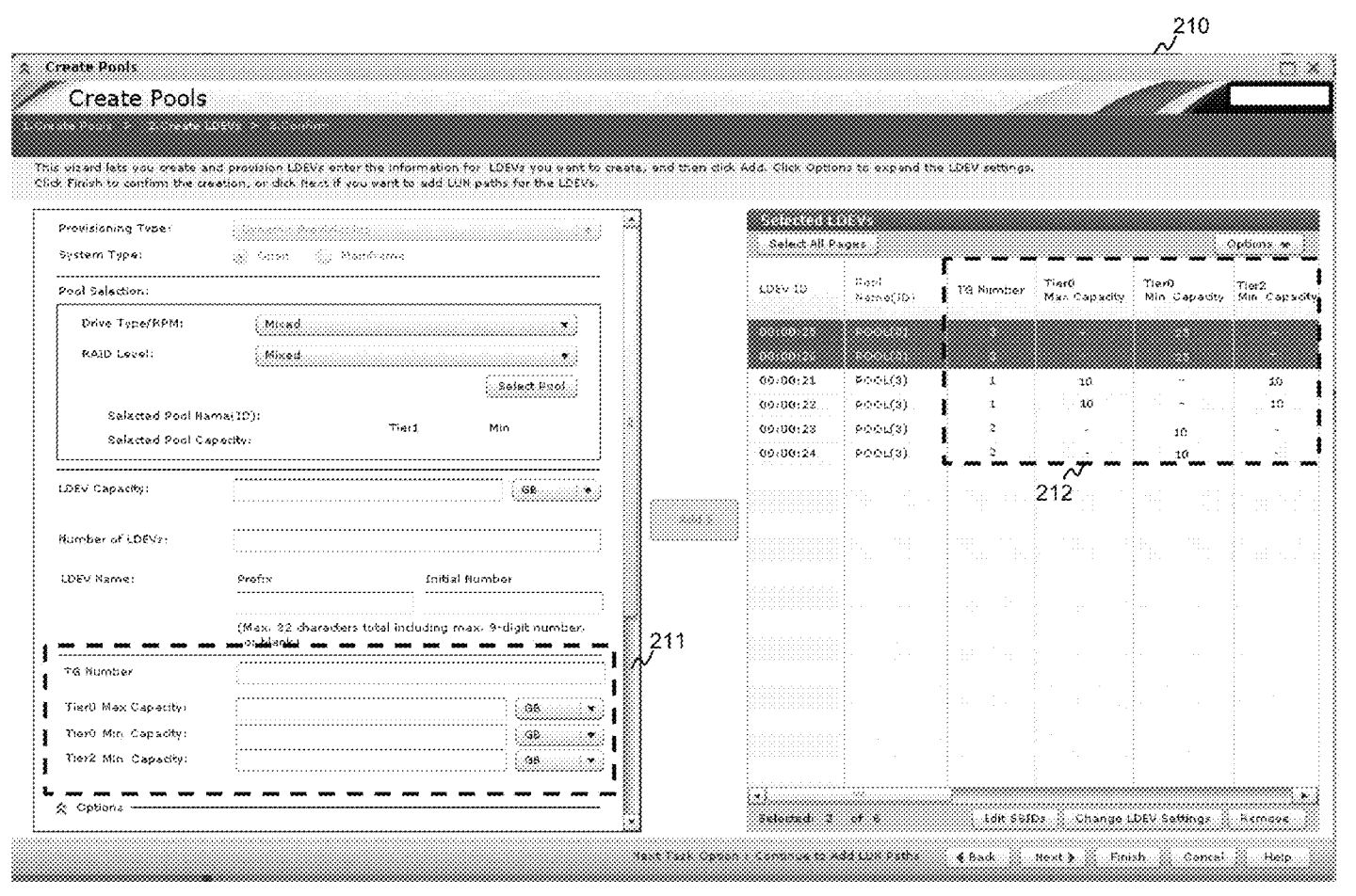

FIG. 21 is a view showing a configuration example of a TG setting screen when creating a virtual volume according to embodiment 1.

A TG setting screen 210 shows a screen displayed on the output device 33a of the management terminal 33, which includes an input area 211 of the TG setting items and a display area 212 of input information.

The input area 211 of the TG setting items includes four input areas, which are a "TG number" for entering the TG number, a "Tier 0 Max Capacity" for entering the maximum amount of use in Tier 0, a "Tier 0 Min Capacity" for entering the minimum amount of use in Tier 0, and a "Tier 2 Min Capacity" for entering the minimum amount of use in Tier 2.

Further, the display area 212 of input information has the above-described input information displayed thereto, and the user or the system administrator can confirm the input information. For example, it can be seen based on display area 212 that in TG #3, the Tier 0 minimum capacity is set to 25 GB, and that the Tier 0 maximum capacity and the Tier 2 minimum capacity are not set.

As described, the CPU 33b of the management terminal 33 executes the acquisition of the TG number or the constraint conditions and the display of acquired information.

<Additional Setting of TG/Confirmation of Contents of Setting of TG>

Figure 22:
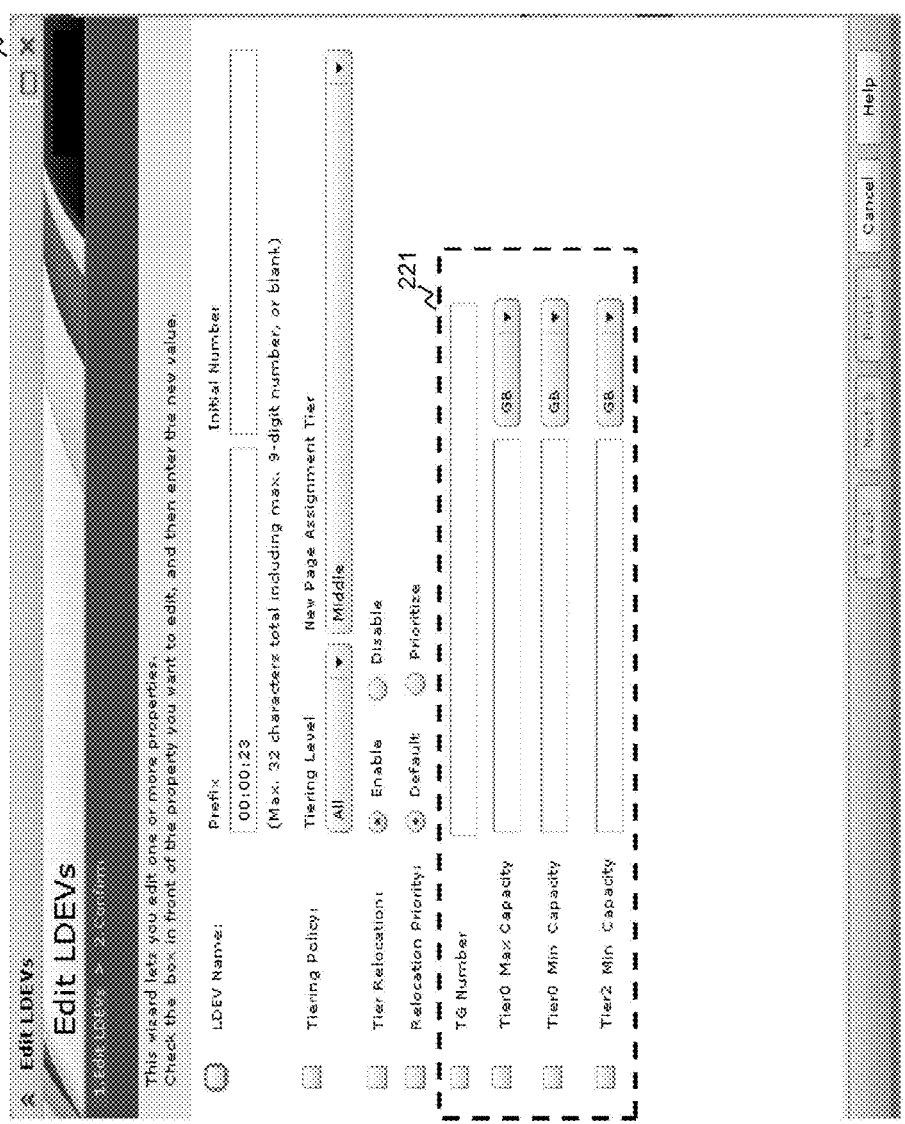
FIG. 22 is a view showing a configuration example of a TG setting screen for changing TG settings after creating a virtual volume according to embodiment 1.
Figure 23:
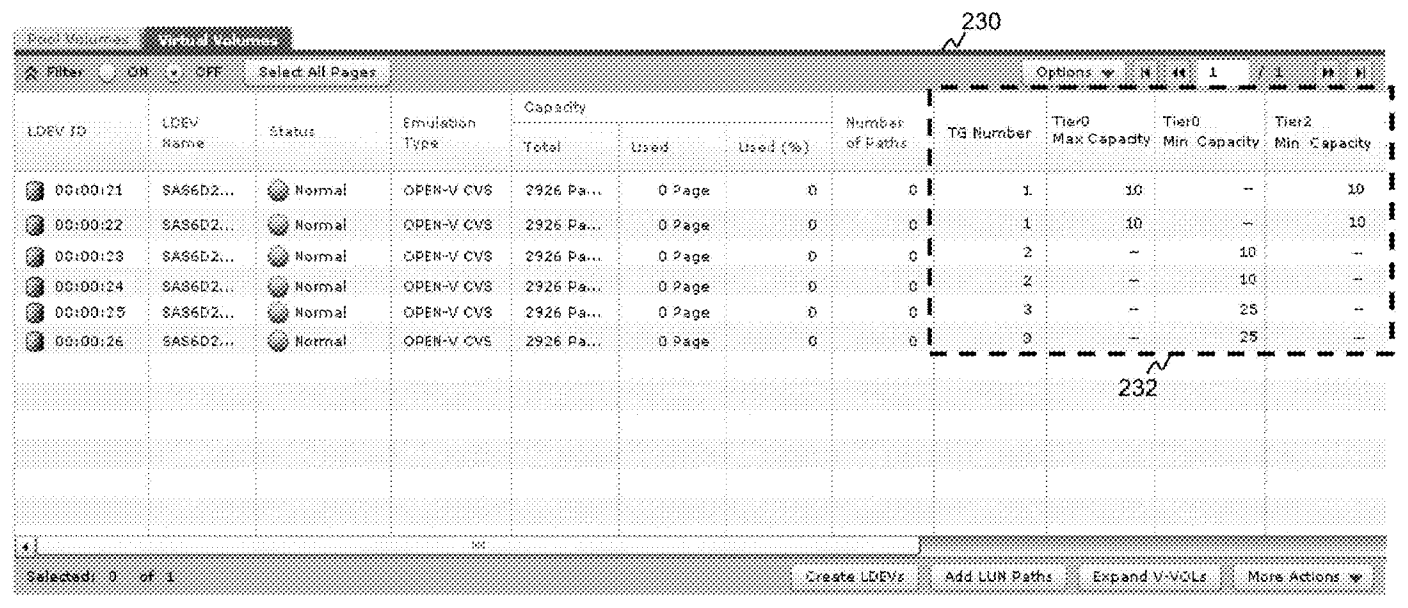

FIG. 22 is a view showing a configuration example of a TG setting screen for changing TG settings after creating a virtual volume according to embodiment 1. FIG. 23 is a view showing a configuration example of a TG setting confirmation screen for confirming the contents of the TG setting according to embodiment 1.

In the case of executing the change of setting of TG after creating a virtual volume, similar to FIG. 21, the given TG number and the constraint conditions such as the Tier 0 maximum capacity are entered and set in the input area of the setting screen 220, similar to FIG. 21.

Further, the user or the system administrator can confirm the TG number or the constraint conditions set up when creating the virtual volume or after creating the virtual volume on a display area 232 of the confirmation screen 230 of FIG. 23.

For example, it can be seen that with respect to TG #1, the Tier 0 maximum capacity and the Tier 2 minimum capacity is 10 GB, respectively, and the Tier 0 minimum capacity is not set. Further, the TG number or the constraint conditions can be set dynamically, that is, while continuing operation of the storage system 30.

Now, the process of FIG. 18 will be described again.

In S1802, the CPU 31b creates a virtual volume I/O frequency distribution table 150 (FIG. 15) based on the virtual page I/O count management table 80 (FIG. 8).

In S1803, the CPU 31b adds the frequency distribution of the virtual volume of the same TG using the TG setting information management table 200 acquired via the management terminal 33, and creates a frequency distribution per TG. For example, since the virtual volume #3 and virtual volume #4 are subjected to grouping according to TG #1 of Pool #0, the CPU 31b creates a frequency distribution of TG #1 by adding the frequency distribution of virtual volume #3 and the frequency distribution of virtual volume #4.

Actually, the CPU 31b adds the number of pages of the virtual volume in which the virtual volume #150a of the virtual volume I/O frequency distribution table 150 is "3" and the number of pages of the virtual volume in which the virtual volume #150a is "4".

Similarly, the CPU 31b adds the cumulative I/O count of virtual volume #3 and the cumulative I/O count of virtual volume #4. The CPU 31b creates a frequency distribution as shown in FIG. 17(b), that is, the TG frequency distribution, based on the added results. The CPU 31b performs the above-described processing for each TG of each pool, and a frequency distribution of each TG is created.

In S1804, the CPU 31b executes a constraint condition processing (FIG. 24) of the Tier 0 minimum capacity using the created TG frequency distribution and the minimum amount of use of Tier 0 set in the TG setting information management table 200.

<Constraint Condition Processing of Tier 0 Minimum Capacity>

Figure 24:
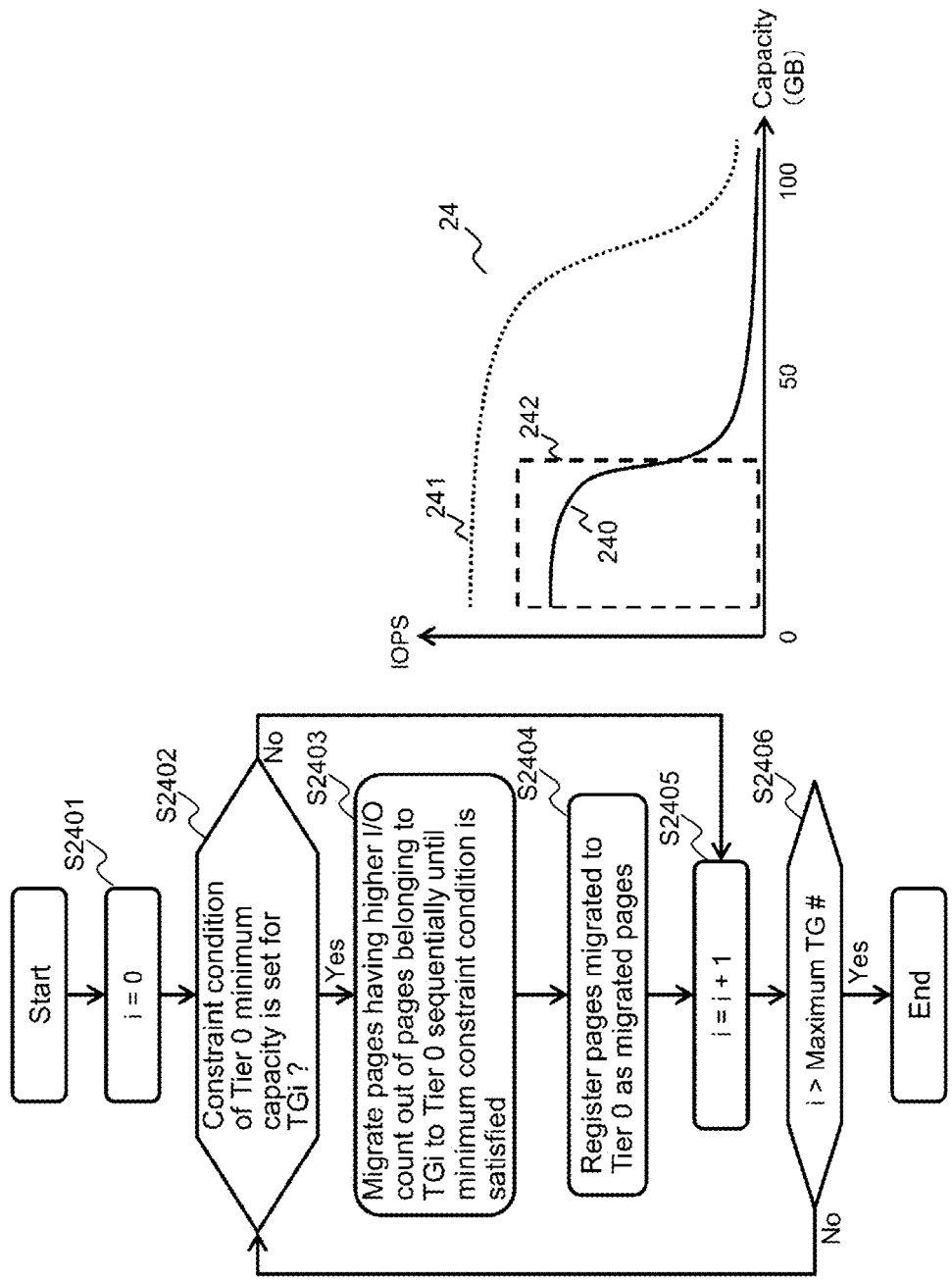
FIG. 24 is a flowchart showing a constraint condition processing of the minimum amount of use of Tier 0 according to embodiment 1.

FIG. 24 is a flowchart showing the constraint condition processing of the Tier 0 minimum capacity according to embodiment 1.

According to the constraint condition processing of the Tier 0 minimum capacity, the minimum amount of use of Tier 0 in TG 0 is set to 30 GB as the constraint condition. Tier 0 is necessarily allocated to the section 242 (capacity 30 GB) surrounded by the dotted line of the frequency distribution graph 240 of TG 0.

In S2401, the CPU 31b sets i which is an identification number of TG to "0".

In S2402, the CPU 31b determines whether the constraint condition of the minimum amount of use of Tier 0 is set to TGi (TG0) based on the TG setting information management table 200.

If the constraint condition of the Tier 0 minimum capacity is not set (S2402: No), the CPU 31b executes S2405. If the constraint condition is set (S2402: Yes), the CPU 31b executes S2403. Since based on the TG setting information management table 200, the constraint condition of the Tier 0 minimum capacity of TG0 is set to 30 GB, the CPU 31b executes S2403.

In S2403, using the virtual page I/O count management table 80, the CPU 31b searches virtual pages having a higher I/O count out of the virtual pages belonging to the virtual volume (virtual volumes #0, #1 and #2) of the TGi (TG0) until the amount of use of Tier 0 in TG0 reaches the minimum capacity, and the searched virtual pages are migrated from Tier 1 or Tier 2 to Tier 0.

In S2404, the CPU 31*b* records the virtual pages migrated to Tier 0 as migrated pages to the management tables such as the allocation table 50 or the virtual page I/O count management table 80.

In S2405, the CPU 31*b* adds 1 to the TG identification number i. In other words, the CPU 31*b* updates the value of i from "0" to "1".

In S2406, the CPU 31*b* determines whether or not the identification number i of the TG has exceeded the maximum TG number. For example, in case of POOL #0, the maximum TG number is "1" (TG0 and TG1 exist in POOL #0), so that the identification number i of TG has not exceeded the maximum TG number (S2406: No). Therefore, the CPU 31*b* repeats the process of S2402 and thereafter.

In S2402, the CPU 31*b* determines based on the TG setting information management table 200 whether a constraint condition of the Tier 0 minimum capacity has been set for TG1. Since based on the TG setting information management table 200 the constraint condition of the Tier 0 minimum capacity is "not set" (S2402: No), the CPU 31*b* adds 1 to the identification number i of TG in S2405, and sets the processing target TG to TG2.

In S2406, the CPU 31*b* re-determines whether the identification number i of TG has exceeded the maximum TG number or not. In POOL #1, since TG2 does not exist, the CPU 31*b* ends the constraint condition processing of the Tier 0 minimum capacity. The processes from S2401 to S2406 can also be performed by the CPU 31*b* for the pools other than POOL #0.

In the prior art, the incase in the I/O count of TG1 has caused no Tier 0 to be allocated to TG0, according to which the access performance of TG0 has been deteriorated. According to the present invention, as described earlier, at least 30 GB of Tier 0 can be used by TG0 regardless of the I/O count of TG0. Therefore, it becomes possible to reduce the influence that the increase in the I/O count of TG1 has on the access performance of TG0.

Next, in S1805 (FIG. 18), the CPU 31*b* executed the constraint condition processing (FIG. 25) of the Tier 2 minimum capacity using the created TG frequency distribution and the Tier 2 minimum capacity set in the TG setting information management table 200.

<Constraint Condition Processing of Tier 2 Minimum Capacity>

Figure 25:
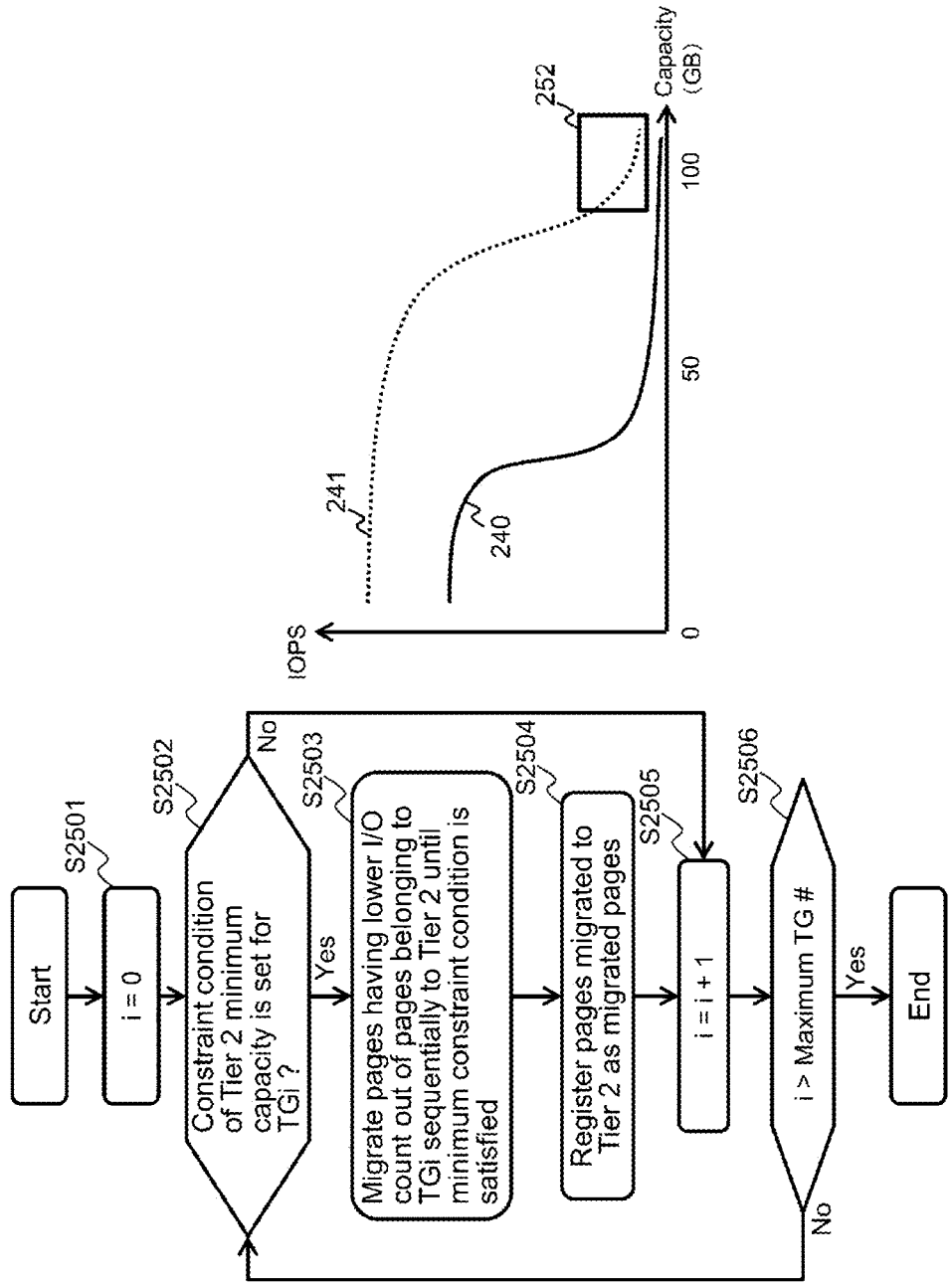
FIG. 25 is a flowchart showing a constraint condition processing of the minimum amount of use of Tier 2 according to embodiment 1.

FIG. 25 is a flowchart showing a constraint condition processing of the minimum amount of use of Tier 2 according to embodiment 1.

According to the constraint condition processing of the Tier 2 minimum capacity, the minimum amount of use of Tier 2 in TG1 as constraint condition is set to 20 GB. Tier 2 is necessarily allocated to the section 252 surrounded by the dotted line in the frequency distribution graph 241 of TG1 (20 GB capacity).

In S2501, the CPU 31*b* has i as identification number of TG set to "0".

In S2502, the CPU 31*b* determines whether the constraint condition of the Tier 2 minimum capacity is set for TGi (TG0) based on the TG setting information management table 200.

If the constraint condition of the Tier 2 minimum capacity is not set (S2502: No), the CPU 31*b* executes S2505. If the constraint condition is set (S2502: Yes), the CPU 31*b* executes S2503. Based on the TG setting information management table 200, the constraint condition of the Tier 2 minimum capacity of TG0 is "not set", so that the CPU 31*b* executes S2505.

In S2505, the CPU 31*b* adds 1 to the TG identification number i. In other words, the CPU 31*b* updates the value of i from "0" to "1".

In S2506, the CPU 31*b* determines whether the identification number i of TG has exceeded the maximum TG number or not. In the case of POOL #0, the maximum TG number is "1", so that the CPU 31*b* executes the process of S2502 again.

In S2502, the CPU 31*b* determines whether the constraint condition of the Tier 2 minimum capacity is set for TG1 based on the TG setting information management table 200. Since based on the TG setting information management table 200 the constraint condition of the Tier 2 minimum capacity (20 GB) is set for TG1 (S2502: Yes), so that the CPU 31*b* executes S2503.

In S2503, the CPU 31*b* searches virtual pages having lower I/O counts out of the pages belonging to TG1 from the virtual page I/O count management table 80 until the amount of use of Tier 2 in TG1 has reached the minimum amount of use of 20 GB, and the searched virtual pages are migrated sequentially from Tier 0 or Tier 1 to Tier 2.

In S2504, the CPU 31*b* registers the virtual pages being migrated to Tier 2 as migrated pages in the management tables such as the allocation table 50 and the virtual page I/O count management table 80.

In S2505, the CPU 31*b* adds 1 to the TG identification number i, sets TG2 as the processing target TG, and determines whether the maximum TG number has been exceeded or not. Since TG2 does not exist in POOL #0, the CPU 31*b* ends the constraint condition processing of the Tier 2 minimum capacity. The CPU 31*b* can also execute the processes from S2501 to S2506 for pools other than POOL #0.

As described, since the TG1 must use at least 20 GB of Tier 2, so that restriction of exclusive use or amount of use of Tier 0 or Tier 1 by TG1 can be realized. According to this process, the influence that the increase in the I/O count of TG1 has on the access performance of TG0 can be reduced.

Now, the process of FIG. 18 will be described again.

In S1806, the CPU 31*b* adds the frequency distribution per TG of the same pool, and creates a frequency distribution per pool. For example, in POOL #0, the frequency distribution 240 of TG0 and the frequency distribution 241 of TG1 are added to create a pool frequency as shown in FIG. 17(*b*). The CPU 31*b* executes the creation processing for each pool.

In S1807, the CPU 31*b* allocates the virtual pages other than the already migrated pages to the upper tier until the drive performance or the tier capacity is satisfied, and when the drive performance is exceeded, the CPU 31*b* allocates the pages to the next tier (of the same level or of a lower level).

Next, in S1806 (FIG. 18), the CPU 31*b* executes the constraint condition processing (FIG. 26) of the Tier 0 maximum capacity using the created TG frequency distribution and the Tier 0 minimum capacity set in the TG setting information management table 200.

<Constraint Condition Processing of Tier 0 Maximum Capacity>

FIG. 26 is a flowchart showing the constraint condition processing of the Tier 0 maximum capacity according to embodiment 1.

According to the constraint condition processing of the Tier 0 maximum capacity, the maximum amount of use of Tier 1 in TG1 is set to 30 GB as the constraint condition. In the frequency distribution graph 241 of TG1, the capacity of the range of arrow 260 (dotted line range 261 and solid line range 262) is assumed to be 50 GB.

In S1808, the CPU 31*b* executes the constraint condition processing of the Tier 0 maximum capacity (FIG. 26) using the maximum amount of use in Tier 0 set in the TG setting information management table 200 and the created TG frequency distribution.

In S2601, the CPU 31b sets the TG identification number i to "0".

In S2602, the CPU 31b determines whether the constraint condition of the Tier 0 maximum capacity is set for TGi (TG0) based on the TG setting information management table 200.

If the setting of the constraint condition of the Tier 0 maximum capacity is not set (S2602: No), the CPU 31b executes S2606. If the constraint condition is set (S2602: Yes), the CPU 31b executes S2603. Based on the TG setting information management table 200, since the constraint condition of the Tier 0 maximum capacity of TG0 is "not set", the CPU 31b executes S2606.

In S2606, the CPU 31b adds 1 to the TG identification number i. In other words, the CPU 31b updates the value of i from "0" to "1".

In S2607, the CPU 31b determines whether the TG identification number i has exceeded the maximum TG number or not. For example, in the case of POOL #0, the maximum TG number is "1", so that the CPU 31b re-executes the process of S2602.

In S2602, the CPU 31b determines based on the TG setting information management table 200 whether the Tier 0 maximum capacity is set for TG1 as the constraint condition. Since based on the TG setting information management table 200 the constraint condition of the Tier 0 maximum capacity is set to "30 GB" (S2602: Yes), so that the CPU 31b executes S2603.

In S2603, the CPU 31b determines whether the current amount of use of Tier 0 by TGi (TG1) is greater than the Tier 0 maximum capacity set as the constraint condition. If the amount of use of Tier 0 by TG1 is not greater than the constraint condition of "30 GB" (S2603: No), the CPU 31b executes S2606, and if greater (S2603: Yes), the CPU executes S2604.

In FIG. 26, as mentioned earlier, TG1 has already used 50 GB of Tier 0, exceeding the constraint condition 30 GB by 20 GB. Thus, the CPU 31b changes the allocation of capacity 20 GB having exceeded the maximum amount of use (solid line range 262) from TG1 to TG0. Incidentally, prior to changing the allocation, TG0 was only capable of using 10 GB (capacity shown by arrow 265) of Tier 0.

In S2604, the CPU 31b searches the virtual pages having a lower I/O count from the virtual pages allocated to Tier 0 of TGi (TG1) corresponding to 20 GB worth of capacity having exceeded the maximum capacity from the virtual page I/O count management table 80, and migrates the pages sequentially from Tier 0 to Tier 1.

In S2605, the CPU 31b searches the virtual pages having a higher I/O count from the virtual pages belonging to Tier 1 of a TG (TG0 in FIG. 26) other than TGi (TG1 from the virtual page I/O count management table 80, and migrates pages corresponding to a capacity of 20 GB (solid line range 266) sequentially from Tier 1 to Tier 0.

Thereafter, the CPU 31b registers the virtual pages migrated to Tier 0 or Tier 1 as migrated pages in the management tables such as the allocation table 50 or the virtual page I/O count management table 80.

In S2606, the CPU 31b adds 1 to the TG identification number i, sets TG2 as the processing target TG, and determines whether the maximum TG number has been exceeded in S2607. Since TG2 does not exist in POOL #1, the CPU 31b ends the constraint condition processing of the Tier 0 maximum capacity. The CPU 31b can execute the process of S2601 to S2607 for pools other than POOL #0.

As described, the amount of use of Tier 0 in TG1 can be restricted to a maximum of 30 GB, so that it becomes possible to prevent TG1 from using up all of Tier 0. In other words, if the maximum capacity of Tier 0 is 60 GB, TG0 is enabled to increase the amount of use of Tier 0 from 10 GB to 30 GB. Therefore, it becomes possible to prevent the access performance of TG0 to be influenced by the increase of I/O count of TG1.

For example, if the virtual volume belonging to pool 0 is used by the database application operating in the host computer 34, TG0 will be the virtual volume group used in the index section, and TG1 will be the virtual volume group used in the body section storing real data.

As for the TG0 used by the index section required to realize high speed access, 30 GB can necessary be used according to the aforementioned constraint condition of the Tier 0 minimum capacity, so that high speed access performance can be realized. In addition, as for TG1 used by the body section not required to have such a high access performance as the index section, the constraint condition of the Tier 0 maximum capacity and the constraint condition of the Tier 2 minimum capacity enable to reduce the influence provided to the response performance of TG0.

<<Embodiment 2>>

<<Outline>>

The storage system 30 according to embodiment 2 has the following functions (1) and (2).

(1) A function to subject a plurality of virtual volumes belonging to the same pool to grouping.

(2) A function to set up a weighting condition for each TG.

The items to be set as weighting conditions are "scope" and "weight". The "scope" designates the scope in which weighting is performed in each TG. The "weight" designates the multiplying factor of weighting. For example, if the capacity of TG0 is 100 GB, wherein the scope is set to 30 GB and the weight is set to two times, weighting is performed to a scope of 30 GB of pages having higher I/O counts out of all virtual pages of TG0. Further, since the weight is two times, the I/O count of the virtual pages belonging to the 30 GB range is doubled.

Weighting is performed to the I/O count of the virtual pages corresponding to the scope of the weighting condition set in advance and the created frequency distribution per TG, and based on the weighting result, the virtual page I/O count management table and the frequency distribution per TG are updated based on the weighted result.

Next, the frequency distributions per TG having been updated by weighting of the TG belonging to the same pool are added to create the frequency distribution per pool.

Migration of virtual pages to the upper tier is performed sequentially from the virtual pages having higher I/O counts until the drive performance or the tier capacity is satisfied. When the drive performance or the tier capacity is exceeded, the tier of the next tier (of the same level or of a lower level) is selected and migration of virtual pages is performed.

As described, by providing weighting conditions for each TG, it becomes possible to allocate the scope of pages being weighted in each TG to the upper level Tier 0, so that it becomes possible to reduce the influence caused by the increase of load of other TGs to the response performance of internal TG.

<<Page Relocation Processing by Weighting>>

Figure 27:
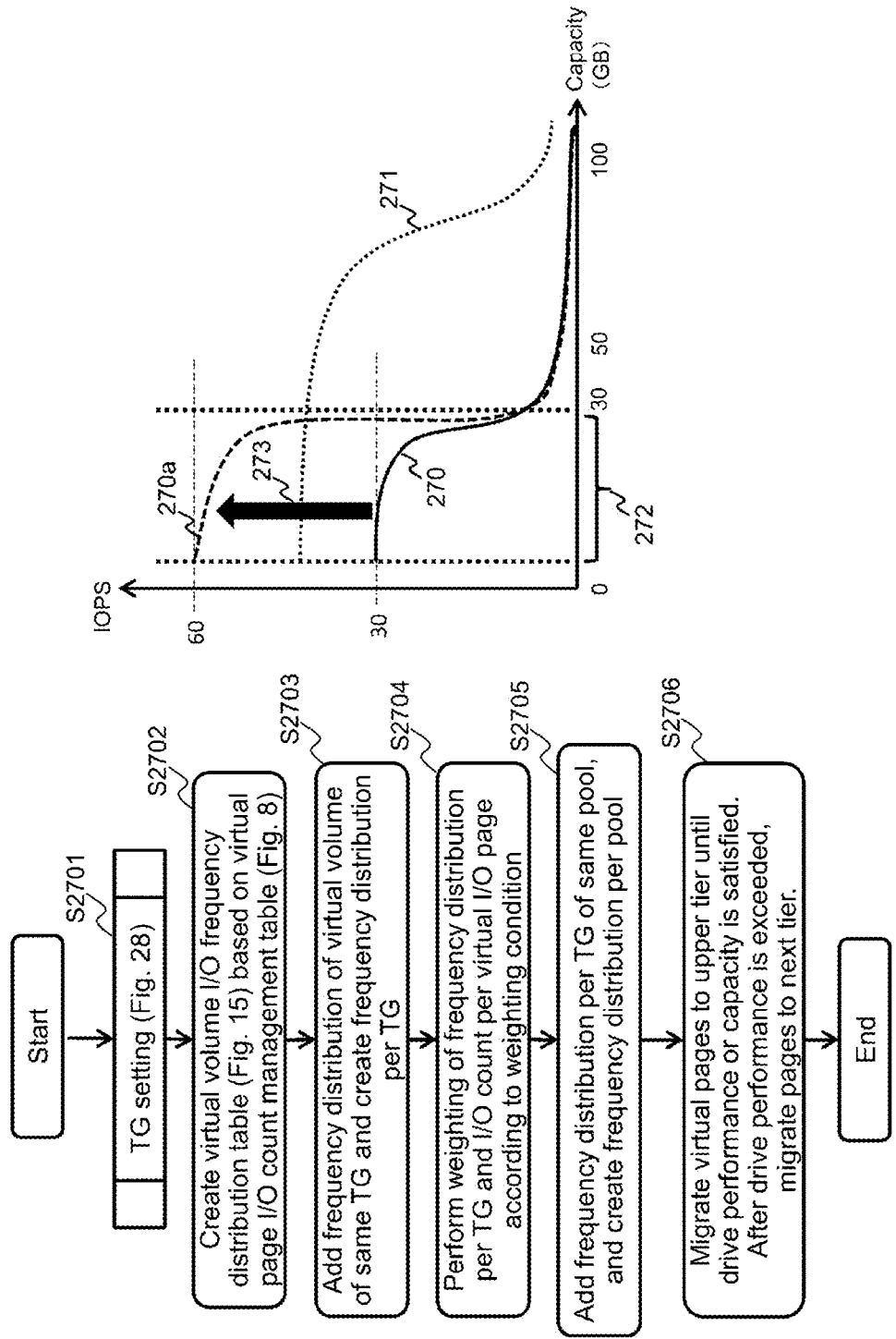
FIG. 27 is a flowchart showing the page relocation processing by weighting per TG according to embodiment 2.
Figures 28, 29:
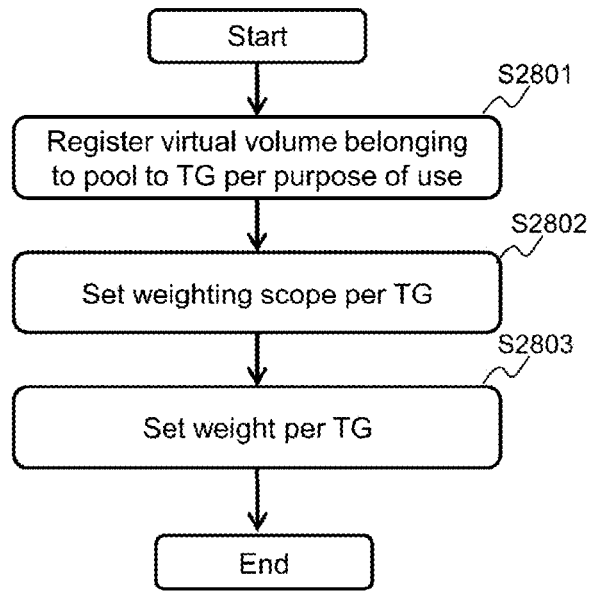
FIG. 28 is a flowchart showing the TG setting process according to embodiment 2.
FIG. 29 is a view showing a configuration example of a TG setting information management table according to embodiment 2.

FIG. 27 is a flowchart showing the page relocation processing by weighting per TG according to embodiment 2. FIG. 28 is a flowchart showing the TG setting process according to embodiment 2.

In S2701, the CPU 31b executes the TG setting process illustrated in FIG. 28.

<TG Setting/TG Setting Information Management Table 2>

In the process of S2801 to S2803 of FIG. 28, the predetermined information is set for the TG setting items illustrated in FIG. 29.

<TG Setting Information Management Table 2>

Figure 30:
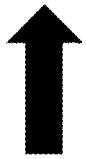
FIG. 30 is a view showing a configuration example before and after weighting of the TG setting information management table according to embodiment 2.

FIG. 29 is a view showing a configuration example of a TG setting information management table according to embodiment 2. FIG. 30 is a view showing a configuration example before and after weighting of the TG setting information management table according to embodiment 2.

The TG setting information management table 290 of FIG. 29 is composed of a POOL #290a, a TG #290b, a virtual volume #290c belonging to each TG, and a weighting condition 290d. The POOL #290a, the TG #290b and the virtual volume #290c belonging to each TG are the same as the TG setting information management table 200 of FIG. 20.

The weighting condition 290d is composed of "scope" and "weight", as mentioned earlier. The "scope" designates the scope (capacity) for performing weighting in the frequency distribution of each TG. The "weight" designates the multiplying factor of weighting to the I/O count (IOPS) in the frequency distribution per TG.

For example, when the capacity of TG #0 of POOL #0 is 100 GB, the scope is 30 GB and the weight is double, weighting is performed to the I/O count (IOPS) of virtual pages corresponding to a capacity of 30 GB of the virtual pages having a higher I/O count out of all virtual pages of TG #0. According to the present example, since the weight is double, the I/O counts of the virtual pages belonging to the 30 GB scope are doubled.

Actually, the virtual pages subjected to weighting in the virtual page I/O count management table 300 prior to weighting of FIG. 30(a) are the virtual page #2 of virtual volume #0 in which the virtual volume #300a is "0" and the virtual page #300b is "2" and the virtual page #0 of virtual volume #2 in which the virtual volume #300a is "2" and the virtual page #300b is "0".

Further, it can be seen that the I/O count 300c per virtual page of the current virtual page is "512" from reference number 301 and "635" from reference number 302.

In the present embodiment, double weighting is executed for the aforementioned virtual page. That is, in the virtual page I/O count management table 310 after weighting of FIG. 30(b), the I/O count per virtual page 300c is respectively set to "1024" and "1270", as shown by reference numbers 311 and 312.

At first, in S2801 (FIG. 28), the CPU 33b of the management terminal 33 acquires the information on the virtual volumes to be subjected to grouping for each purpose of use as the TG that the user or the system administrator entered through the input device 33e such as a keyboard on the setup screen displayed on the output device 33a such as a display.

In S2802, the CPU 33b acquires the condition of the scope for performing weighting for each TG set by the user or the system administrator, similar to the information on the virtual volume subjected to grouping for each purpose of use.

In S2803, the CPU 33b acquires the weight (multiplying factor) for each TG set by the user or the system administrator, similar to the information on the virtual volume subjected to grouping for each purpose of use.

After acquiring the weight (multiplying factor) condition of each TG, the CPU 33b assembles the various acquired information as the TG setting information management table 290. Then, the CPU 33b sends the assembled TG setting information management table 290 via the NIC 33d to the storage system 30.

The CPU 31b of the storage system 30 acquires the TG setting information management table 290 sent from the management terminal 33 via the NIC 31d, and stores the same in the shared memory area in the memory 31c.

<New Setting of TG>

Figure 31:
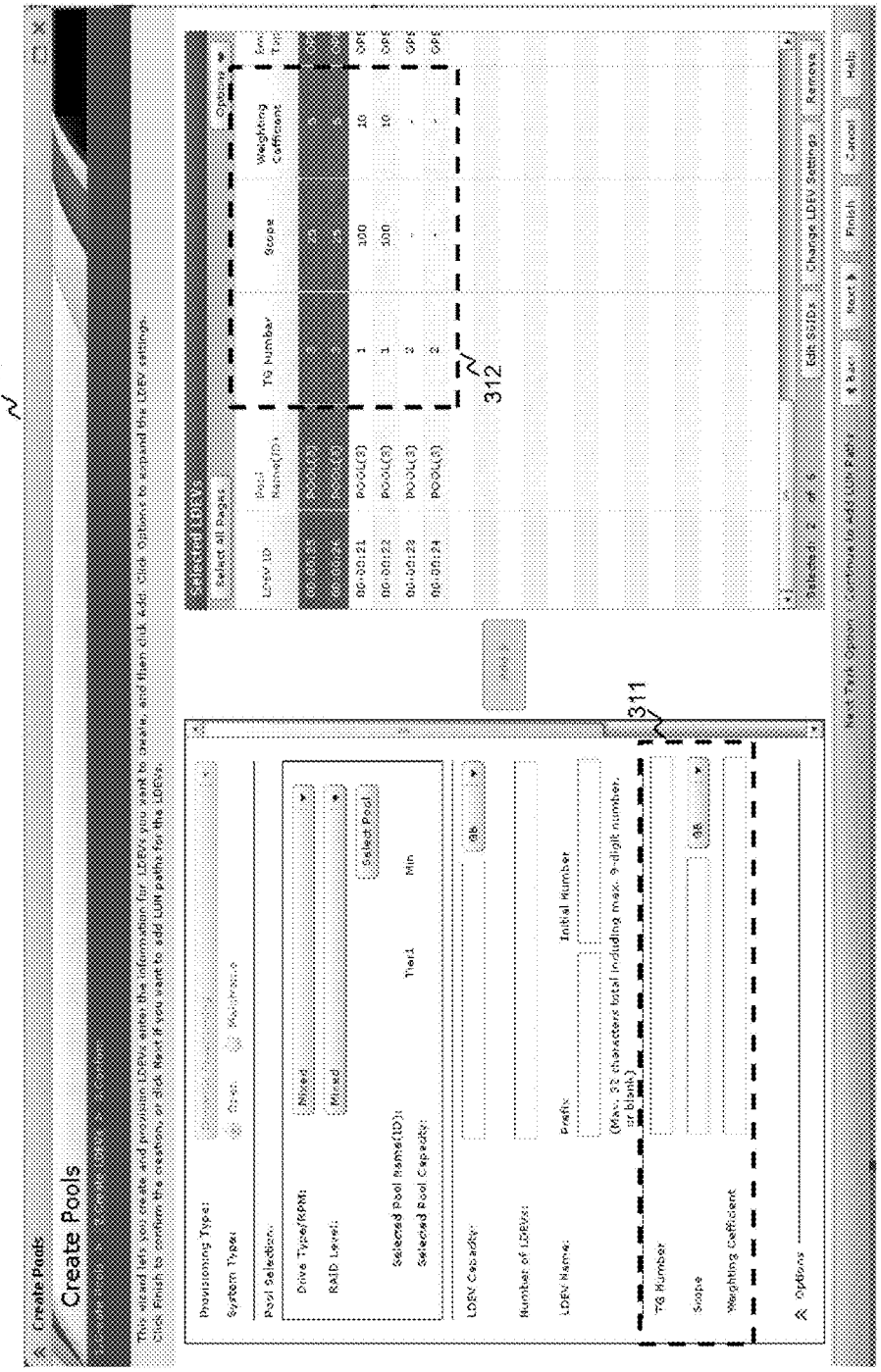
FIG. 31 is a view showing a configuration example of a TG setting screen when creating a virtual volume according to embodiment 2.

FIG. 31 is a view showing a configuration example of a TG setting screen when creating a virtual volume according to embodiment 2. The characteristic feature of the TG setting screen 310 according to embodiment 2 is that the input area 311 of the TG setting items are composed of input areas of a "TG number" for entering the TG number, the "scope" for entering the scope and the "weighting coefficient" for entering the weight. Further, in the display area 312, the TG number, the entered weighting scope and the weight are displayed by the CPU 33b.

<Additional Setting of TG/Confirmation of Contents of TG Setting>

Figure 32:
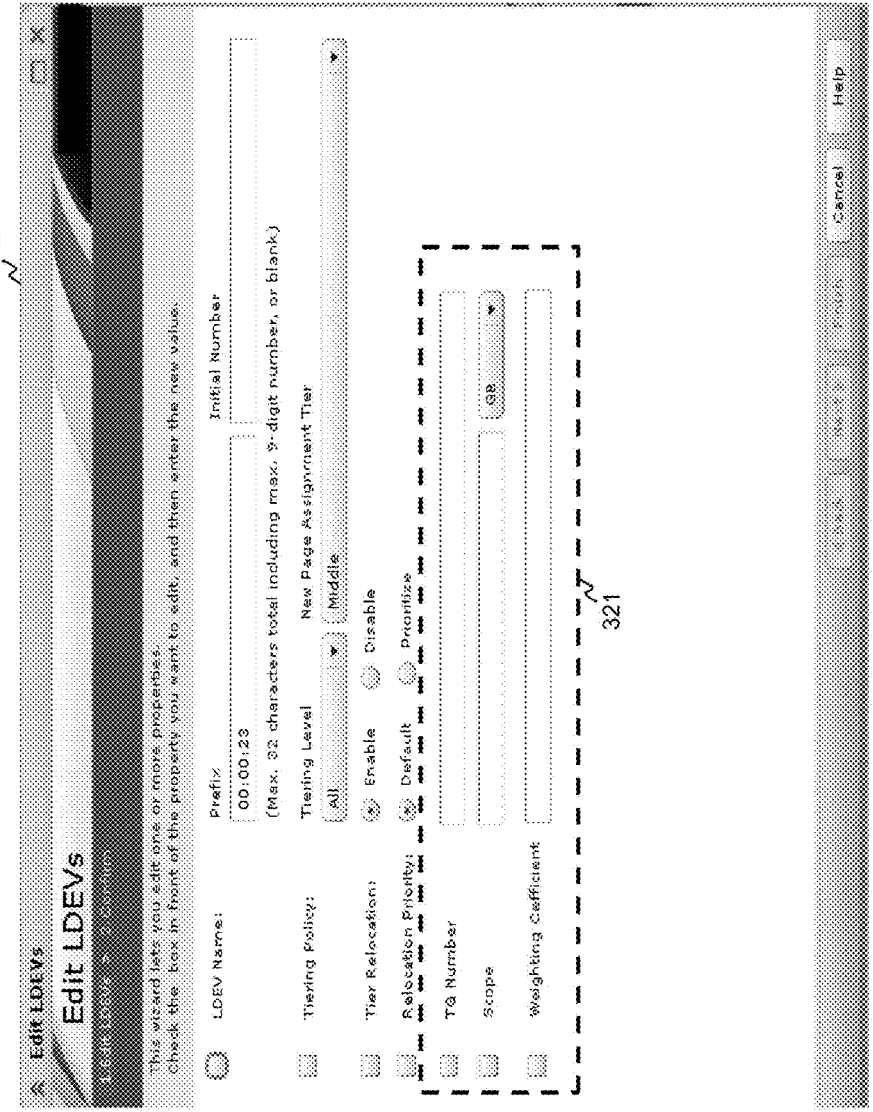
FIG. 32 is a view showing a configuration example of a TG setting screen for performing change of TG setting after creating a virtual volume according to embodiment 2.

FIG. 32 is a view showing a configuration example of a TG setting screen for performing change of TG setting after creating a virtual volume according to embodiment 2. FIG. 33 is a view showing a configuration example of a TG setting confirmation screen for confirming the contents of the TG setting according to embodiment 2.

In executing the change of setting of the TG after creating the virtual volume, similar to FIG. 31, the predetermined TG number and the weighting conditions are entered and set in the input area 321 of the setting screen 320.

Furthermore, the user or the system administrator can confirm the input information such as the TG number or the weighting condition set during creation of the virtual volume or after creation of the virtual volume via the display area 331 of the confirmation screen 330 of FIG. 33. The TG number or the weighting condition can be set or changed dynamically, that is, while operating the storage system 30.

Now, the process of FIG. 27 will be described again.

The processes of S2702 and S2703 are the same as the processes of S1802 and S1803, so the description thereof is omitted.

In S2704, the CPU 31 executes weighting to the I/O count per virtual I/O page according to the weighting condition, and changes the frequency distribution per TG. In other words, weighting is performed by a double weight 273 with respect to the IOPS of the virtual page in range 272 (corresponding to 30 GB) of the frequency distribution 270 of TG0, and the frequency distribution 270 of TG0 is changed to frequency distribution 270a.

Thereby, the IOPS in the frequency distribution of TG0 in range 272 becomes greater than the IOPS of the frequency distribution of TG1, so that the Tier 0 which is the upper tier is allocated with priority to the virtual page of TG0.

In S2705, the CPU 31b adds the frequency distribution per TG of the same pool, similar to S1806, and creates a frequency distribution per pool. Further, in S2706, the CPU 31b allocates the virtual pages to the upper level tier until the drive performance or the tier capacity is satisfied. If the drive performance is exceeded, the CPU 31b selects the next tier, and allocates the virtual pages to that tier.

As described, by setting a weighting condition for each TG, the scope having been weighted in each TG can be easily allocated to the upper level Tier 0, so that the influence to the access performance of the TG due to load variation of other TGs can be reduced.

<<Embodiment 3>>

<<Outline>>

The storage system 30 according to embodiment 3 has the following functions (1) and (2).

(1) A function to subject a plurality of virtual volumes belonging to the same pool to grouping (2) A function to set up a targeted average response time for each TG The user registers the virtual volume group to be subjected to grouping for each TG using the management terminal 33, sets up a targeted average response time for each TG, and the set information is acquired by the storage system 30.

The storage system 30 creates a frequency distribution per pool based on the acquired information and the management information such as the virtual page I/O count management table 80, and the virtual pages having a higher I/O count are migrated sequentially to the upper tier until the drive performance or the tier capacity are satisfied.

When the drive performance or the tier capacity is exceeded, the next tier (same level or lower level) is selected and migration is performed thereto.

When migration of all virtual pages belonging to a pool is completed, the average response time per TG is calculated, and the calculated value is compared with the targeted average response time (targeted value) set in advance to confirm whether the calculated value satisfies the targeted value.

If the calculated value has not satisfied the targeted value, a virtual page allocated to Tier 0 (upper level tier) in the virtual pages of a TG other than the relevant TG that can be migrated to Tier 1 (lower tier) without causing the calculated value of the average response time of that TG from falling below the targeted average response time is searched.

Then, a process to switch the virtual page having the highest I/O count within the virtual pages belonging to Tier 1 of the relevant TG with the aforementioned virtual page of the Tier 0 will be executed. The above-described process is repeatedly executed until the average response time calculated for all the TGs has satisfied the targeted average response time.

FIG. 34 is used to describe the aforementioned operation in detail. FIG. 34 is a view showing the concept of page relocation/re-reallocation processing by the setting of the targeted average response time according to embodiment 3.

FIG. 34(*a*) shows a state in which a page relocation plan has been determined based on the respective TG frequency distribution and page reallocation has been executed. Reference number 340 shows the frequency distribution of TG0 and reference number 341 shows the frequency distribution of TG1.

In this state, Tier 0 having a capacity shown by reference number 342 is allocated to the virtual page of TG1, while Tier 0 is not allocated to the virtual page of TG0.

In this state, the average response time of TG0 and TG1 are calculated as calculated values, and the calculated values are compared with the set targeted average response time (targeted value).

TG0 is in a state where the calculated value has exceeded the targeted value of average response time, that is, in a state where the actual response time is long and response is delayed. TG1 is in a state where the calculated value is smaller than the target value of average response time, that is, in a state where the actual response time is short and response is quick.

Therefore, based on the result of (a), Tier 0 corresponding to the excess of performance of TG1 is migrated to TG0 and the targeted average response time of TG0 is achieved thereby.

In other words, as shown in FIG. 34(*b*), the virtual pages having lower I/O counts of TG1 allocated to Tier 0 are migrated corresponding to capacity 343 (excessive performance portion) to the virtual pages of TG0, thereby realizing an arrangement as shown by reference 344. This process is called page re-relocation processing.

According to this page re-relocation processing, the calculated value of average response time in TG1 is increased, but the calculated value of the average response time in TG0 can be reduced while satisfying the targeted value.

As described, by providing a function for setting the targeted average response time for each TG, it becomes possible to satisfy the response performance required by the user for each TG regardless of the change of load of other TGs. Moreover, by forming TGs from virtual volumes used in the application operating in the host computer 34 or the storage system 30, it becomes possible to reduce the influence to the access performance among applications.

<<Page Relocation Processing by Setting Targeted Average Response Time>>

Figure 35:
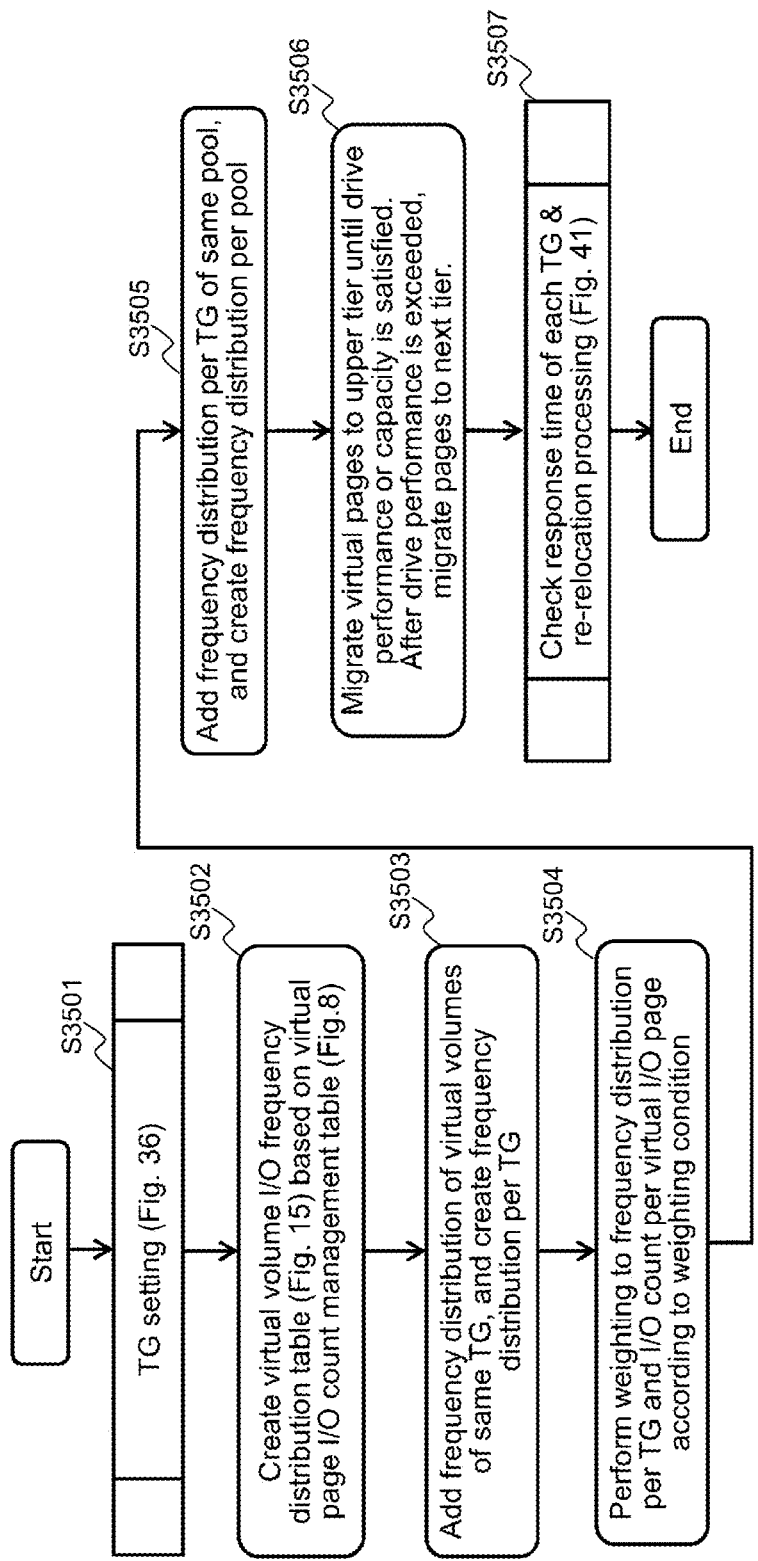
FIG. 35 is a flowchart showing the page relocation processing by setting the targeted average response time according to embodiment 3.
Figures 36, 37:
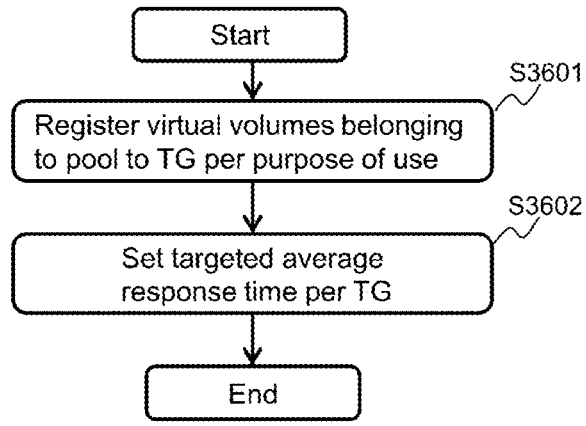
FIG. 36 is a flowchart showing the TG setting process according to embodiment 3.
FIG. 37 is a view showing a configuration example of a TG setting information management table according to embodiment 3.

FIG. 35 is a flowchart showing the page relocation processing by setting the targeted average response time according to embodiment 3. FIG. 36 is a flowchart showing the TG setting process according to embodiment 3.

In S3501, the CPU 31*b* executes the TG setting process shown in FIG. 36.

<TG Setting/TG Setting Information Management Table 3>

In the process of S3601 to S3602 of FIG. 36, predetermined information is set with respect to the TG setting items shown in FIG. 37.

FIG. 37 is a view showing a configuration example of a TG setting information management table according to embodiment 3.

The TG setting information management table 370 of FIG. 37 is composed of a POOL #370*a*, a TG #370*b*, virtual volume #370*c* belonging to each TG, and a targeted average response time 370*d*. The POOL #370*a*, the TG #370*b* and the virtual volume #370*c* belonging to each TG are the same as in the TG setting information management table 200 of FIG. 20 and the TG setting information management table 290 of FIG. 29.

The targeted average response time 370*d* sets the value of the average response time required in each TG. For example, 5 msec is set for TG #0 of POOL #0, and 8 msec is set for TG #1, and the values are compared with the calculated average response time. The targeted average response time can be set for all TGs of the pool.

Further, it is also possible to set the value for only one TG and not set the value for the other TGs, leaving the value to "not set", as in POOL #1.

In S3601 (FIG. 36), the CPU 33*b* of the management terminal 33 acquires the information on the virtual volume subjected to grouping as TG per purpose of use that the user or the system administrator enters through the input device 33*e* such as a keyboard on the setup screen displayed on the output device 33*a* such as a display.

In S3602, the CPU 33*b* acquires the targeted average response time set by the user or the system administrator, similar to the information on the virtual volume subjected to grouping per purpose of use.

After acquiring the targeted average response time, the CPU 33*b* assembles the acquired various information as a TG setting information management table 370. Then, the CPU 33b sends the assembled TG setting information management table 370 via the NIC 33d to the storage system 30.

The CPU 31b of the storage system 30 acquires the TG setting information management table 370 sent from the management terminal 33 via the NIC 31d, and stores the table in the shared memory area in the memory 31c, for example.

<New Setting of TG>

Figure 38:
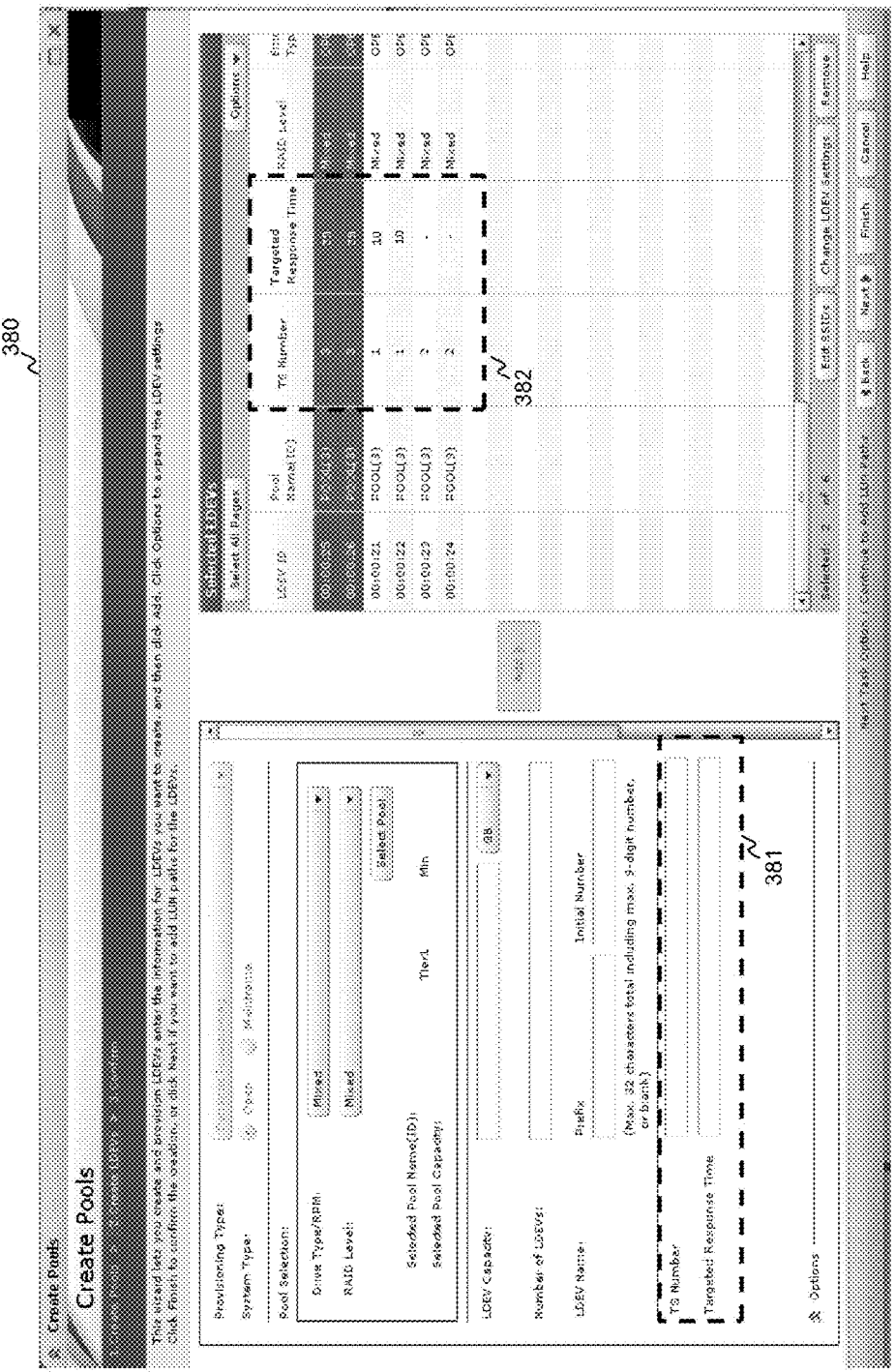
FIG. 38 is a view showing a configuration example of a TG setting screen when a virtual volume is created according to embodiment 3.

FIG. 38 is a view showing a configuration example of a TG setting screen when a virtual volume is created according to embodiment 3. An input area 381 of the TG setting items on the TG setting screen 380 is composed of a "TG Number" for entering the TG number and a "Targeted Response Time" for entering the targeted average response time. The entered information is displayed on the display area 382 via CPU 33b.

<Additional Setting of TG/Confirmation of Setting Contents of TG>

Figure 39:
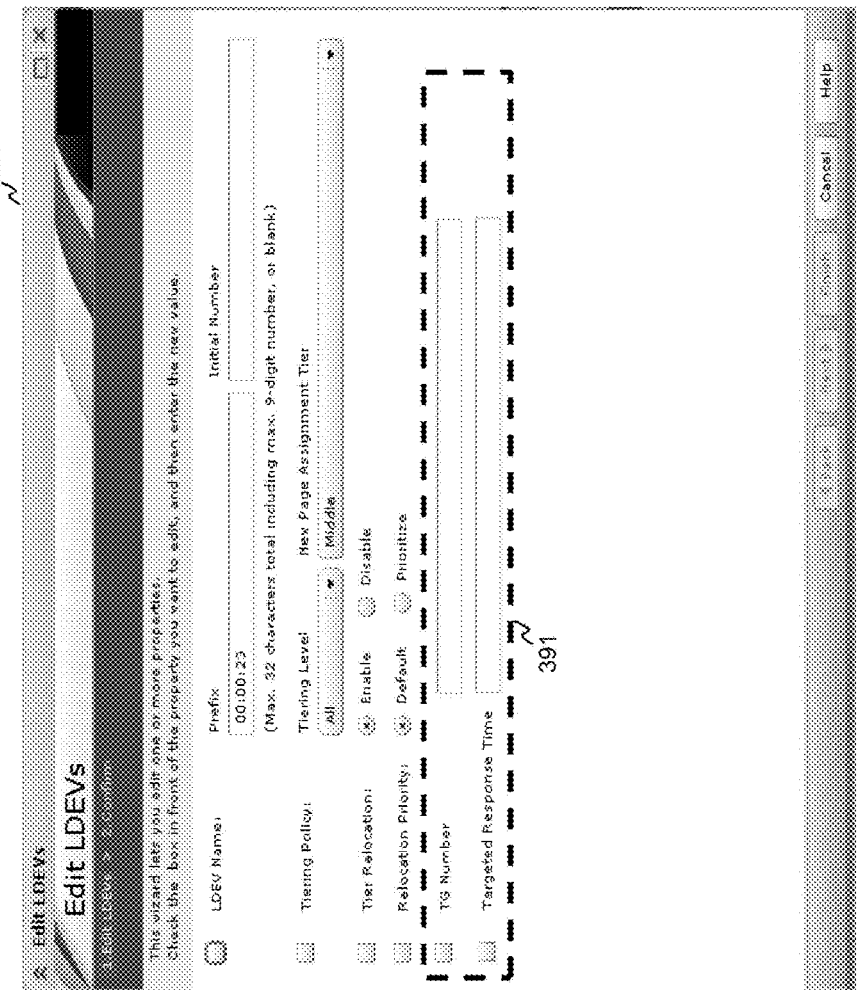
FIG. 39 is a view showing a configuration example of a TG setting screen for changing the TG setting after creating the virtual volume according to embodiment 3.
Figure 40:
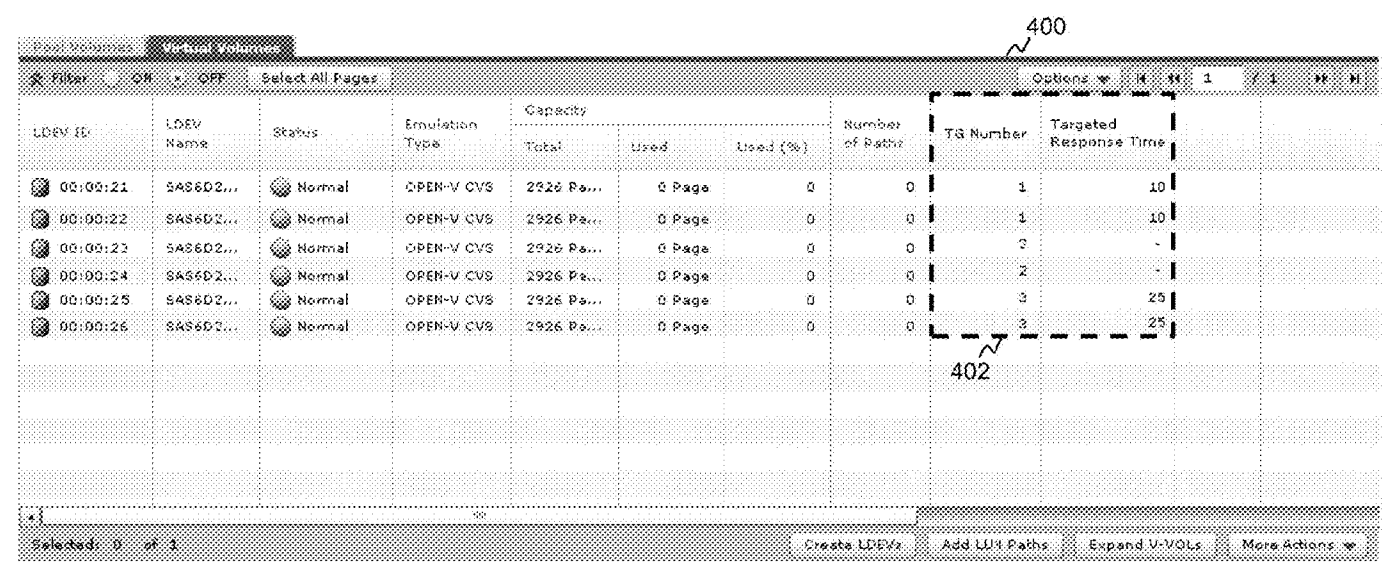

FIG. 39 is a view showing a configuration example of a TG setting screen for changing the TG setting after creating the virtual volume according to embodiment 3. FIG. 40 is a view showing a configuration example of a TG setting confirmation screen for confirming the contents of TG setting according to embodiment 3.

Similar to FIG. 38, when executing the change of setting of TG after creating the virtual volume, the user or the system administrator enters and sets the predetermined TG number and the targeted average response time in the input area 391 of the setting screen 390.

Moreover, the user or the system administrator can confirm on the display area 402 of the confirmation screen of 400 in FIG. 40 the TG number and the targeted average response time set during or after creation of the virtual volume. Further, the TG number or the targeted average response time can be set and changed dynamically, that is, set and changed while the storage system 30 is operating.

Now, the process of FIG. 35 will be described again.

The processes from S3502 to S3506 are the same as the processes from S2702 to S2706 of embodiment 2, so the descriptions thereof are omitted. In the flowchart of FIG. 35, the weighting process in embodiment 2 is executed to reduce the influence that the increase in the I/O count of TG1 has on the access performance of TG0, and the influence is further reduced by performing the page re-relocation processing using the targeted average response time.

Further, the influence on the access performance can also be reduced merely by performing the page re-relocation processing of S3507 without executing the weighting process of S3504.

Figure 41:
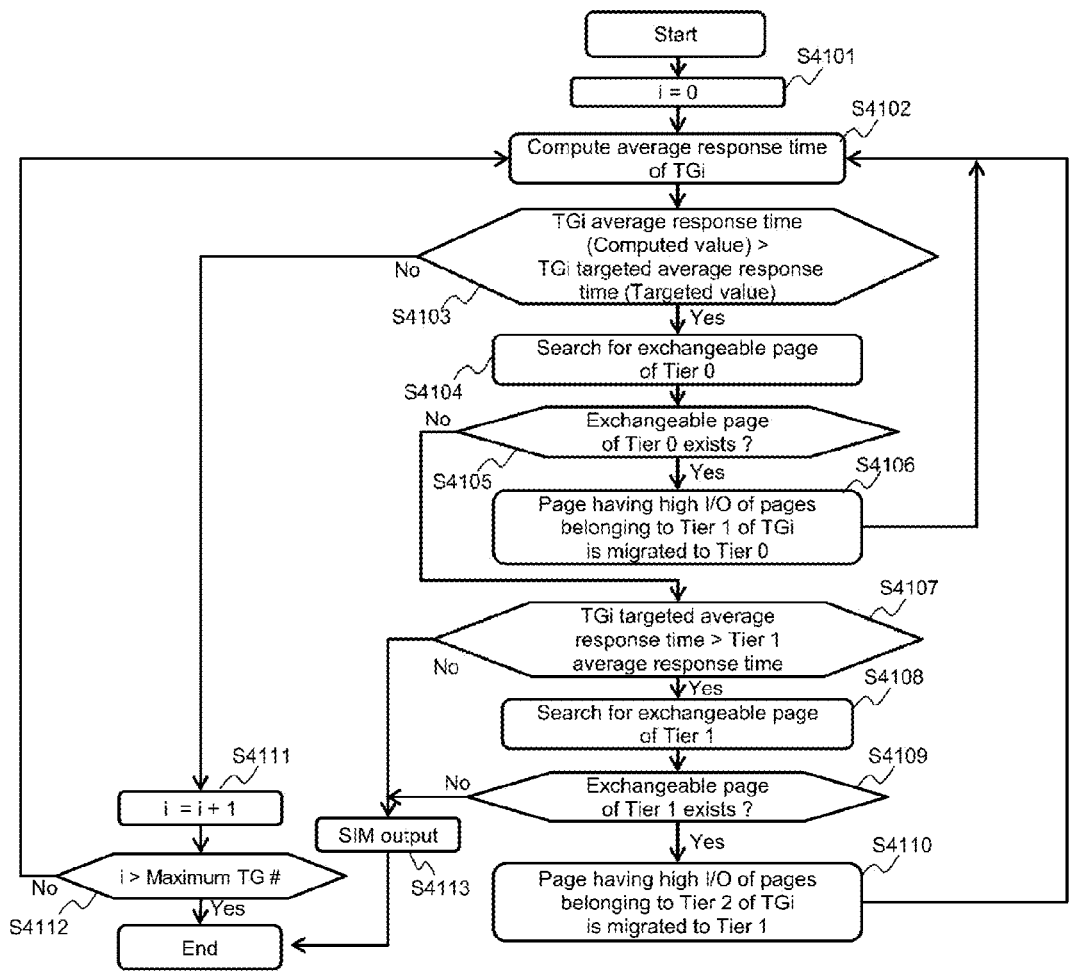
FIG. 41 is a flowchart showing the page re-relocation processing by setting the targeted average response time according to embodiment 3.

In S3507, the CPU 31b executes the response time check for each TG and the page re-relocation processing shown in FIG. 41.

<Page Re-relocation Processing>

FIG. 41 is a flowchart showing the page re-relocation processing by setting the targeted average response time according to embodiment 3.

In S4101, the CPU 31b sets i as the identification number of TG to 0.

In S4102, the CPU 31b computes an average response time R_all of the whole TGi using Expression 3. At first, since the TG identification number i is "0", the average response time R_all of TG0 is computed using Expression 3.

$$R\_all = (\text{Sum}(Tj \times Rj)(j=0-n))/(\text{Sum}(Tj)(j=0-n)) \quad \text{Expression 3}$$

1) j: The number of Tier #
2) Rj: Average response time of Tier # j
3) Tj: Total I/O count of Tier # j In S4103, the CPU 31b compares the average response time (calculated value) of TG0 computed in Expression 3 with the set targeted average response time (targeted value) of TG0. If the calculated value is greater than the targeted value (S4103: Yes), it is necessary to arrange a high level tier having high speed as the virtual pages of TG0, so the CPU 31b executes S4104.

Incidentally, there is no virtual page of TG0 allocated to Tier 0, and all of Tier 0 is allocated to the virtual pages of TG1.

If the calculated value is not greater than the targeted value (S4103: No), that is, if the current average response time satisfies the targeted value, the CPU 31b executes S4111 to process the next TG.

In S4104, the CPU 31b searches exchangeable pages of Tier 0. That is, the virtual page allocated to Tier 0 from TGs other than TG0 (for example, TG1) that can be migrated to Tier 1 without causing the average response time of the relevant TG (TG1) (calculated value) from exceeding the targeted average response time is searched.

In S4105, the CPU 31b determines whether an exchangeable page exists or not in Tier 0. If an exchangeable page exists in Tier 0 (S4105: Yes), the CPU 31b executes S4106.

If there is no exchangeable page in Tier 0 (S4105: No), the CPU 31b executes searching of the exchangeable page in Tier 1 and the migration processing of virtual pages of S4107 and thereafter.

In S4106, the CPU 31b migrates the virtual page having a lower I/O count out of the virtual pages belonging to Tier 0 other than TG0 (for example, TG1) to Tier 1, and the virtual page having a higher I/O count out of the virtual pages belonging to Tier 1 of TG0 to Tier 0.

After completing the process of S4106, the CPU 31b re-executes the processes of S4102 to S4106 until the calculated value falls below the targeted value of average response time or until there are no more exchangeable pages in Tier 0.

In S4107, the targeted average response time (targeted value) of TG0 is compared with the average response time in Tier 1. If the average response time in Tier 1 is smaller than the targeted value (S4107: Yes), the CPU 31b executes S4108. At this time, by migrating (allocating) the virtual page allocated to Tier 2 of TG0 to Tier 1, the average response time of TG0 can be reduced.

If the average response time in Tier 1 is not smaller than the targeted average response time (targeted value) of TG0 (S4107: No), the CPU 31b executes S4113.

In S4108, the CPU 31b searches the exchangeable pages of Tier 1. That is, the virtual pages allocated to Tier 1 out of the virtual pages of TGs other than TG0 (such as TG1) that can be migrated to Tier 2 without causing the TG to fall below the target response time are searched.

In S4109, the CPU 31b determines whether an exchangeable page exists in Tier 1 or not. If there is an exchangeable page existing in Tier 1 (S4109: Yes), the CPU 31b executes S4110.

In S4110, the CPU 31b migrates the virtual page having a lower I/O count out of the virtual pages belonging to Tier 1 other than TG0 (such as TG1) to Tier 2, and migrates the virtual page having a higher I/O count out of the virtual pages belonging to Tier 2 of TG0 to Tier 1.

After completing the process of S4110, the CPU 31b re-executes the processes of S4102 to S4110 until either the condition in which the calculated value falls below the targeted value of the average response time is satisfied or when there is no more exchangeable page in Tier 0 or Tier 1.

If there is no exchangeable page in Tier 1 (S4109: No), the CPU 31*b* executes S4113.

In S4111, the CPU 31*b* adds 1 to the TG identification number i. That is, the CPU 31*b* updates the value of i from "0" to "1".

In S4112, the CPU 31*b* determines whether the TG identification number i has exceeded the maximum TG number. For example, since the maximum TG number of POOL #0 is "1" according to the TG setting information management table 370, the CPU 31*b* re-executes the processes of S4102 and thereafter for TG1.

In S4113, the CPU 31*b* determines that it is impossible for the average response time (calculated value) in the present TG to satisfy the targeted average response time (targeted value). Therefore, the CPU 31*b* outputs a SIM (Service Information Message) indicating that the required response performance cannot be satisfied according to the configuration of the storage drives disposed in the storage system 30, and ends the page re-relocation processing.

As described, by setting a targeted average response time (targeted value) for each TG and changing the tiers by computing the average response time in each TG and comparing the same with the targeted value, the virtual pages of respective TGs can be equally allocated to upper level tiers, which are Tier 0 and Tier 1. Therefore, the influence that the change of load of other TGs has on the access performance of a TG can be reduced. Further, it is possible to prevent the delay and termination of processes of application software caused by the deterioration of access performance in a storage system.

Embodiment 3 has been described in combination with the weighting process illustrated in embodiment 2, but embodiment 3 can also be performed in combination with embodiment 1. Further, all the embodiments 1 through 3 can be performed in combination.

In the description of embodiments 1 through 3, units such as virtual volume units used by the application, TG units having assembled virtual volumes, and pool units having further assembled TGs have been taken as examples for description.

It is also possible to apply the present invention not in application units but in OS units or file units. In other words, the virtual volumes used in OS units or file units are subjected to grouping as TGs to execute the page relocation processing and the page re-relocation processing of embodiments 1 through 3, according to which the influence to access performances in the storage system can be reduced. Moreover, it is also possible to prevent delay and termination of processing of application software caused by the deterioration of access performance in the storage system.

Similarly, the present invention can be applied to other units, such as host computer units, virtual machine units operating in the host computer, and partition units having divided the storage drive into two or more sections.

The present invention is not restricted to the embodiments mentioned above, and other various modified examples are included in the scope of the invention. The preferred embodiments of the present invention have been merely illustrated for better understanding of the present invention, and they are not intended to restrict the scope of the present invention in any way.

A portion of the configuration of an embodiment can be replaced with the configuration of another embodiment, or the configuration of an embodiment can be added to the configuration of another embodiment. Moreover, all portions of the configurations of the respective embodiments can have other configurations added thereto, deleted therefrom, or replaced therewith.

Moreover, a portion or all of the configurations, functions, processing units, processing means and the like described in the description can be realized by hardware such as by designed integrated circuits. The respective configurations, functions and the like can also be realized by software such as by having a processor interpret the program for realizing the respective functions and through execution of the same.

The information such as the programs, tables, files and the like for realizing the respective functions can be stored in storage devices such as memories, hard disks and SSDs (Solid State Drives), or in storage media such as IC cards, SD cards and DVDs.

The control lines and information lines considered necessary for description are illustrated, and not all the control lines and information lines required for production are illustrated. Actually, it can be considered that almost all components are mutually connected.

REFERENCE SIGNS LIST

30 Storage system
50 Allocation table
60 Pool volume management table
70 Pool page management table
80 Virtual page I/O count management table
150 Virtual volume I/O frequency distribution table
160 Pool I/O frequency distribution table
200 TG setting information management table

The invention claimed is:

1. A storage system coupled to a host computer and a management device,
the storage system comprising;
a plurality of storage devices constituting a plurality of volumes, each of the volumes having a plurality of pool pages and belonging to one of a plurality of tiers based on a response performance; and
a storage control unit for controlling the storage system configured to provide a plurality of virtual volumes having a plurality of virtual pages to the host computer, and to allocate the pool page to the virtual page when the virtual page is first used,
wherein the storage control unit
constructs one or more tiering groups, each of the tiering groups including one or more of the virtual volumes,
sets a relocation condition to each of the tiering groups, the relocation condition including a minimum amount of use of each of the tiers, and
for each of the tiering groups, migrates the virtual pages in the virtual volumes belonging to the tiering group to an uppermost tier of the plurality of tiers until an amount of the pool pages of the uppermost tier allocated to the virtual volumes belonging to the tiering group reaches the minimum amount of use of the uppermost tier.

2. The storage system according to claim 1, wherein the storage control unit, for each of the tiering groups, migrates the virtual pages in the virtual volumes belonging to the tiering group to a lowermost tier of the plurality of tiers until an amount of the pool pages of the lowermost tier allocated to the virtual volumes belonging to the tiering group reaches the minimum amount of use of the lowermost tier.

3. The storage system according to claim 1, wherein the relocation condition further includes a maximum amount of use of the uppermost tier; and wherein
when an amount of the virtual pages allocated to the pool pages of the uppermost tier exceeds the maximum amount of use of the uppermost tier, the storage control unit changes the allocation of the virtual pages so that the amount of the pool pages of the uppermost tier allocated to the virtual volumes belonging to the tiering group does not exceed the maximum amount of use of the uppermost tier.

4. The storage system according to claim 1, wherein the setting of relocation conditions is executed by the management device.

5. The storage system according to claim 4, wherein the relocation conditions being set is output to the management device.

6. The storage system according to claim 1, wherein the virtual volumes required to have a high speed response and the virtual volumes not required to have a high speed response are registered with the different tiering groups respectively.

7. The storage system according to claim 1, wherein the virtual volumes used by an application software operating in the host computer and the virtual volumes used by an application software operating in the storage system are registered with the different tiering groups respectively.

8. A storage system coupled to a host computer and a management device, the storage system comprising:
a plurality of storage devices constituting a plurality of volumes, each of the volumes having a plurality of pool pages and belonging to one of a plurality of tiers based on a response performance; and
a storage control unit for controlling the storage system configured to provide a plurality of virtual volumes having a plurality of virtual pages to the host computer, to allocate the pool page to the virtual page when the virtual page is first used, and to maintain I/O count information in each of the virtual pages, the I/O count information managing the number of I/Os generated in the virtual page;
wherein the storage control unit
constructs one or more tiering groups, each of the tiering groups including one or more of the virtual volumes,
sets a relocation condition to each of the tiering groups, the relocation condition including a weighting condition including weight and range for performing weighing,
for each of the tiering groups, performs weighting to the I/O count information of the virtual pages specified with the range by multiplying the I/O count information of the virtual pages by the weight, and
migrates the virtual pages to an uppermost tier of the plurality of tiers sequentially from the virtual pages having higher I/O count information until tier capacity or drive performance is satisfied.

9. The storage system according to claim 8, wherein when the drive performance is exceeded, the storage control unit migrates the virtual pages to a next tier.

10. A storage system coupled to a host computer and a management device, the storage system comprising:
a plurality of storage devices constituting a plurality of volumes, each of the volumes having a plurality of pool pages and belonging to one of a plurality of tiers based on a response performance; and
a storage control unit for controlling the storage system configured to provide a plurality of virtual volumes having a plurality of virtual pages to the host computer, and to allocate the pool page to the virtual page when the virtual page is first used,
wherein the storage control unit
constructs one or more tiering groups, each of the tiering groups including one or more of the virtual volumes,
sets a relocation condition to each of the tiering groups, the relocation condition including a target average response time,
computes an average response time of each of the tiering groups, and
if the computed average response does not satisfy the target average response time, for each of the tiering groups, migrates the virtual page not belonging to an uppermost tier of the plurality of tiers into the uppermost tier repeatedly until the computed average response satisfies the target average response time.

* * * * *